US012596371B2

(12) United States Patent
Fisher et al.

(10) Patent No.: US 12,596,371 B2
(45) Date of Patent: Apr. 7, 2026

(54) SYSTEM AND METHOD FOR INTERCEPTION AND COUNTERING UNMANNED AERIAL VEHICLES (UAVS)

(71) Applicant: AeroVironment, Inc., Arlington, VA (US)

(72) Inventors: Christopher Eugene Fisher, Leo, IN (US); Michael Franklin Morgan, Navarre, FL (US)

(73) Assignee: AeroVironment, Inc., Arlington, VA (US)

( * ) Notice: Subject to any disclaimer, the term of this patent is extended or adjusted under 35 U.S.C. 154(b) by 82 days.

(21) Appl. No.: 18/095,879

(22) Filed: Jan. 11, 2023

(65) Prior Publication Data

US 2023/0168675 A1 Jun. 1, 2023

Related U.S. Application Data

(63) Continuation of application No. 15/982,578, filed on May 17, 2018, now Pat. No. 11,579,610.

(Continued)

(51) Int. Cl.
*G05D 1/00* (2024.01)
*B64U 70/30* (2023.01)
(Continued)

(52) U.S. Cl.
CPC .......... *G05D 1/0094* (2013.01); *F41G 7/224* (2013.01); *F41G 7/30* (2013.01); *F41G 9/002* (2013.01); *F41H 11/02* (2013.01); *F41H 13/0006* (2013.01); *G05D 1/0038* (2013.01); *G05D 1/005* (2013.01); *G05D 1/102*

(2013.01); *G05D 1/12* (2013.01); *B64U 10/13* (2023.01); *B64U 20/87* (2023.01); *B64U 70/30* (2023.01); *B64U 2101/30* (2023.01); *B64U 2201/20* (2023.01)

(58) Field of Classification Search
CPC .... G05D 1/0094; G05D 1/0038; G05D 1/005; G05D 1/102; G05D 1/12; F41G 7/224; F41G 7/30; F41G 9/002; F41H 11/02; F41H 13/0006; B64U 10/13; B64U 20/87; B64U 70/30; B64U 2101/30; B64U 2201/20; B64U 2101/00; B64C 39/024; B64D 1/02; B64D 47/08
See application file for complete search history.

(56) References Cited

U.S. PATENT DOCUMENTS

| | | | |
|---|---|---|---|
| 8,205,537 | B1 | 6/2012 | Dupont |
| 9,085,362 | B1 | 7/2015 | Kilian et al. |

(Continued)

FOREIGN PATENT DOCUMENTS

| | | |
|---|---|---|
| CN | 102947179 A | 2/2013 |
| CN | 104913689 A | 9/2015 |
| DE | 4421139 A1 | 12/1995 |

*Primary Examiner* — Faris S Almatrahi
*Assistant Examiner* — Dana F Artimez
(74) *Attorney, Agent, or Firm* — Command IP LLP; Pejman Yedidsion; Eric Aagaard

(57) ABSTRACT

Systems, devices, and methods for identifying a target aerial vehicle, deploying an interceptor aerial vehicle comprising at least one effector, maneuvering the interceptor aerial vehicle to a position to engage a target aerial vehicle, deploying the at least one effector to intercept the target aerial vehicle, and confirming that the target aerial vehicle has been intercepted.

16 Claims, 24 Drawing Sheets

Related U.S. Application Data

(60) Provisional application No. 62/507,697, filed on May 17, 2017.

(51) Int. Cl.

| | |
|---|---|
| *F41G 7/22* | (2006.01) |
| *F41G 7/30* | (2006.01) |
| *F41G 9/00* | (2006.01) |
| *F41H 11/02* | (2006.01) |
| *F41H 13/00* | (2006.01) |
| B64U 10/13 | (2023.01) |
| B64U 20/87 | (2023.01) |
| B64U 101/30 | (2023.01) |

(56) References Cited

U.S. PATENT DOCUMENTS

| | | | |
|---|---|---|---|
| 2014/0240147 A1* | 8/2014 | Goda | B64D 45/00 |
| | | | 340/945 |
| 2015/0314881 A1* | 11/2015 | Tsaliah | B64D 17/725 |
| | | | 244/146 |
| 2016/0023760 A1 | 1/2016 | Goodrich | |
| 2016/0023761 A1 | 1/2016 | McNally | |
| 2016/0054733 A1 | 2/2016 | Hollida et al. | |
| 2016/0376029 A1* | 12/2016 | Sekiya | B64F 1/0295 |
| | | | 244/110 F |
| 2017/0144756 A1 | 5/2017 | Aagaah et al. | |
| 2017/0261999 A1* | 9/2017 | Van Voorst | G05D 1/0088 |
| 2017/0355461 A1 | 12/2017 | Naito et al. | |
| 2017/0356726 A1 | 12/2017 | Theiss et al. | |
| 2017/0363391 A1 | 12/2017 | Conklin | |
| 2018/0046187 A1* | 2/2018 | Martirosyan | G05D 1/0094 |
| 2018/0362185 A1* | 12/2018 | Qian | G03B 15/006 |
| 2019/0129427 A1* | 5/2019 | Sugaki | B64D 7/00 |

* cited by examiner

100

110

104

108

118

102

120

112

116

114

106

122

1300

1318

1316

1304

1302

1308

1310

SYSTEM AND METHOD FOR INTERCEPTION AND COUNTERING UNMANNED AERIAL VEHICLES (UAVS)

CROSS-REFERENCE TO RELATED APPLICATIONS

This application is a continuation of U.S. Non-Provisional Patent application Ser. No. 15/982,578, which claims priority to and the benefit of U.S. Provisional Patent Application No. 62/507,697, filed May 17, 2017, the contents of all of which are hereby incorporated by reference herein for all purposes.

TECHNICAL FIELD

Embodiments relate generally to aerial vehicles, and more particularly to intercepting unmanned aerial vehicles.

BACKGROUND

The popularity of unmanned aerial vehicles (UAVs), such as quadrotor UAVs, has led to regulations and the enactment of no-fly zones. Users of these UAVs have continued to operate their UAVs in no-fly zones and in other areas, such as near airports, that could cause harm to property and life.

SUMMARY

A method embodiment may include: deploying an interceptor aerial vehicle having at least one effector; maneuvering the interceptor aerial vehicle to a position to engage a target aerial vehicle; and deploying the at least one effector to intercept the target aerial vehicle. The method may also include identifying the target aerial vehicle. The method may also include confirming that the target aerial vehicle has been intercepted. Confirming that the target aerial vehicle has been intercepted may include: determining a capture of the target aerial vehicle in the effector based on a change in position of the interceptor aerial vehicle, where the effector is connected to the interceptor aerial vehicle via a tether; and providing, via a ground control system (GCS) in communication with the interceptor aerial vehicle, at least one of: a visual indication, an audible indication, and a haptic feedback.

Additional method embodiments may include: selecting, via a ground control system (GCS) in communication with the interceptor aerial vehicle, the target aerial vehicle; and tracking the selected target aerial vehicle. Selecting the target aerial vehicle may further include: receiving, at the GCS, a video feed from a camera of the interceptor aerial vehicle; displaying, via a display of the GCS, the video feed containing the target aerial vehicle; and selecting, via a user interface of the GCS, the target aerial vehicle in the video feed. Tracking the selected target aerial vehicle may further include: maneuvering the interceptor aerial vehicle to within a set distance of the target aerial vehicle. Tracking the selected target aerial vehicle may further include: maneuvering a gimbal having the at least one effector and camera to aim the effector toward the target aerial vehicle.

In additional method embodiments, deploying the interceptor aerial vehicle may further include: launching the interceptor aerial vehicle vertically to a set height; and flying the interceptor aerial vehicle horizontally a set distance toward the target aerial vehicle. The set height and set distance may be based on a height and a range of one or more previously encountered target aerial vehicles. Maneuvering the interceptor aerial vehicle to engage the target aerial vehicle may further include: maneuvering the interceptor aerial vehicle to a position above and within a set distance of the target aerial vehicle. Maneuvering the interceptor aerial vehicle to engage a target aerial vehicle may further include: maneuvering the interceptor aerial vehicle based on a change of position of the target aerial vehicle.

In additional method embodiments, maneuvering the interceptor aerial vehicle to engage a target aerial vehicle may further include: providing one or more commands via a ground control system (GCS) in communication with the interceptor aerial vehicle; where the one or more commands may include: a movement of the interceptor aerial vehicle vertically up, a movement of the interceptor aerial vehicle vertically down, a movement of the interceptor aerial vehicle towards the GCS, a movement of the interceptor aerial vehicle away from the GCS, a movement of the interceptor aerial vehicle left about an arc of substantially constant radius from the GCS, and a movement of the interceptor aerial vehicle right about an arc of substantially constant radius from the GCS. The method may also include: capturing the target aerial vehicle in the effector, where the effector is tethered to the interceptor aerial vehicle, and where the effector may be at least one of: a net, a tarp, a sheet, a weapon, and an entanglement device. The interceptor aerial vehicle and the target aerial vehicle may be unmanned aerial vehicles (UAVs).

A system embodiment may include: a remotely operated aerial vehicle; at least one deployment device detachably attached to the remotely operated aerial vehicle, where the at least one deployment device includes: an effector deployable towards a target; a launcher to deploy the effector; and a tether connected between the effector and the deployment device. The effector may be at least one of: a net, a tarp, a sheet, a weapon, and an entanglement device. The system may also include: a plurality of weights, where the plurality of weights are attached about an outer edge of the effector; and where the launcher may further include: a gas generator; and a plurality of channels, where each of the plurality of weights are disposed in a channel of the plurality of channels; where gas generated by the gas generator propels each of the weights through the respective channel of the plurality of channels in different directions from the deployment device, such that the effector opens up. The system may also include: a ground control station (GCS) in communication with the interceptor aerial vehicle, the GCS having a processor configured to: maneuver the interceptor aerial vehicle to a position to engage the target; and deploy the at least one effector to intercept the target vehicle.

Another method embodiment may include: identifying a target aerial vehicle; deploying, via a ground control station (GCS) in communication with an interceptor aerial vehicle, the interceptor aerial vehicle comprising at least one effector; maneuvering, via the GCS, the interceptor aerial vehicle to a position to engage a target aerial vehicle, where the maneuvers include: a movement of the interceptor aerial vehicle vertically up, a movement of the interceptor aerial vehicle vertically down, a movement of the interceptor aerial vehicle towards the GCS, a movement of the interceptor aerial vehicle away from the GCS, a movement of the interceptor aerial vehicle left about an arc of substantially constant radius from the GCS, and a movement of the interceptor aerial vehicle right about an arc of substantially constant radius from the GCS; receiving, at the GCS, a video feed from a camera of the interceptor aerial vehicle; displaying, via a display of the GCS, the video feed containing the target aerial vehicle; selecting, via the GCS, the target aerial vehicle in the video feed; tracking the selected target aerial vehicle; deploying, via the GCS, the at least one effector to intercept the target aerial vehicle; and confirming that the target aerial vehicle has been intercepted.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

As UAVs have become more capable and less expensive their potential for causing interference or damage has greatly increased. As such, a need has arisen for an effective apparatus and means of operation to terminate or at least limit the operation of such threats. However, counter UAV (CUAV) devices and approaches have required detailed knowledge of the threat's position, velocity, and trajectory. Even if such information is available, an intercept of the threat requires precise timing to be effective. These CUAV approaches have been too unwieldy, too expensive to be widely used, and not sufficiently mobile. An additional problem arises as to the availability of sufficiently well trained personnel to carry out such CUAS operations given the complexity of such equipment. As such, what is needed is a relatively inexpensive, quick to deploy, and easy to operate CAUS system and method.

The different aspects of the present embodiments allow for the identification, selection, tracking, and interception of a target aerial vehicle, such as an unmanned aerial vehicle (UAV), that may be located in a set geographic area, such as a do-not-fly zone. A user or operator may identify the target aerial vehicle and launch an interceptor aerial vehicle, such as a UAV, to track and intercept the target UAV. The interceptor UAV may navigate to a position near the target UAV. The interceptor UAV may have at least one deployment device, which may contain an effector, such as a net. In some embodiments, the interceptor UAV may have a plurality of deployment devices. The effector may be deployed to capture the target UAV, such as by entangling the target UAV in the net. The effector may be attached to the interceptor UAV via a tether so that the target UAV may be returned to the operator of the interceptor UAV. The interceptor UAV may then capture additional target UAVs, return to the operator, or land with the target UAV in the effector.

Figure 1A:
FIG. 1A depicts an embodiment of an aerial vehicle intercept system having an interceptor UAV and a target UAV identified.

FIG. 1A depicts an embodiment of an aerial vehicle intercept system 100 having an interceptor UAV 102 and a target UAV 104 that has been identified. UAV's are discussed herein, but any manned or unmanned aerial vehicle (AV) may be used. An operator 106, or user, may identify a target UAV 104 within a set geographic area 108. The geographic area 108 may be a no-fly zone, such as an area near a building 110, government facility, airport, or the like. The operator 106 may align the interceptor UAV 102 towards the target UAV 104, such as by aligning an indicator or arrow (not shown) on the interceptor UAV 102 or a base station 112 towards the target UAV 104.

The interceptor UAV 102 may include a plurality of propulsion devices, such as four rotors for a quadrotor embodiment. The interceptor UAV 102 may also include a processor with addressable memory and a transceiver or receiver and transmitter to communicate with a ground control system (GCS) 114. The operator 106 may use the GCS 114 to control the interceptor UAV 102. The interceptor UAV 102 may include landing gear 116, such as one or more legs. A gimbal 118 may provide a mounting location for holding one or more deployment devices 120 and a camera 130, where the gimbal may be attached to the interceptor UAV 102. One or more deployment devices 120 may be detachably attached to the gimbal 118, such that they may be easily added or removed by the operator 106 or another individual. The interceptor UAV 102 may be placed on the base station 112, which may be located on the ground 122, on a building, on a moving vehicle, etc. The base station 112 may provide power and/or data transfer to the interceptor UAV 102. In some embodiments, the base station 112 may have an enclosure to protect the interceptor UAV 102 from inclement weather when not in use.

Each deployment device 120 may be self-contained to allow for easy attachment to, and removal from, the interceptor UAV 102 and/or gimbal 118. The deployment device 120 may have a substantially rectangular form factor, such as 5 in.×5 in.×3 in. The deployment device 120 may include an effector (134, FIG. 1E), such as a twenty-foot net. The effector may be fired via gravity, a gas generator, a CO2 cartridge, a firearm cartridge, or the like. A small current, such as 1 amp, may be used to actuate the effector. The deployment device 120 may be a one-time use device. The effector may be tethered to the deployment device 120 so as to prevent any captured target UAV 104 from falling and causing harm or damage to an individual or property on the ground 122. The tether connection (140, FIG. 1E) between the effector and the deployment device forgoes the need for an attachment point on the UAV 102 itself. The tether connection point (not shown) on the deployment device 120 may be at or near a central axis of the gimbal 118 and/or interceptor UAV 102.

Figure 11A:
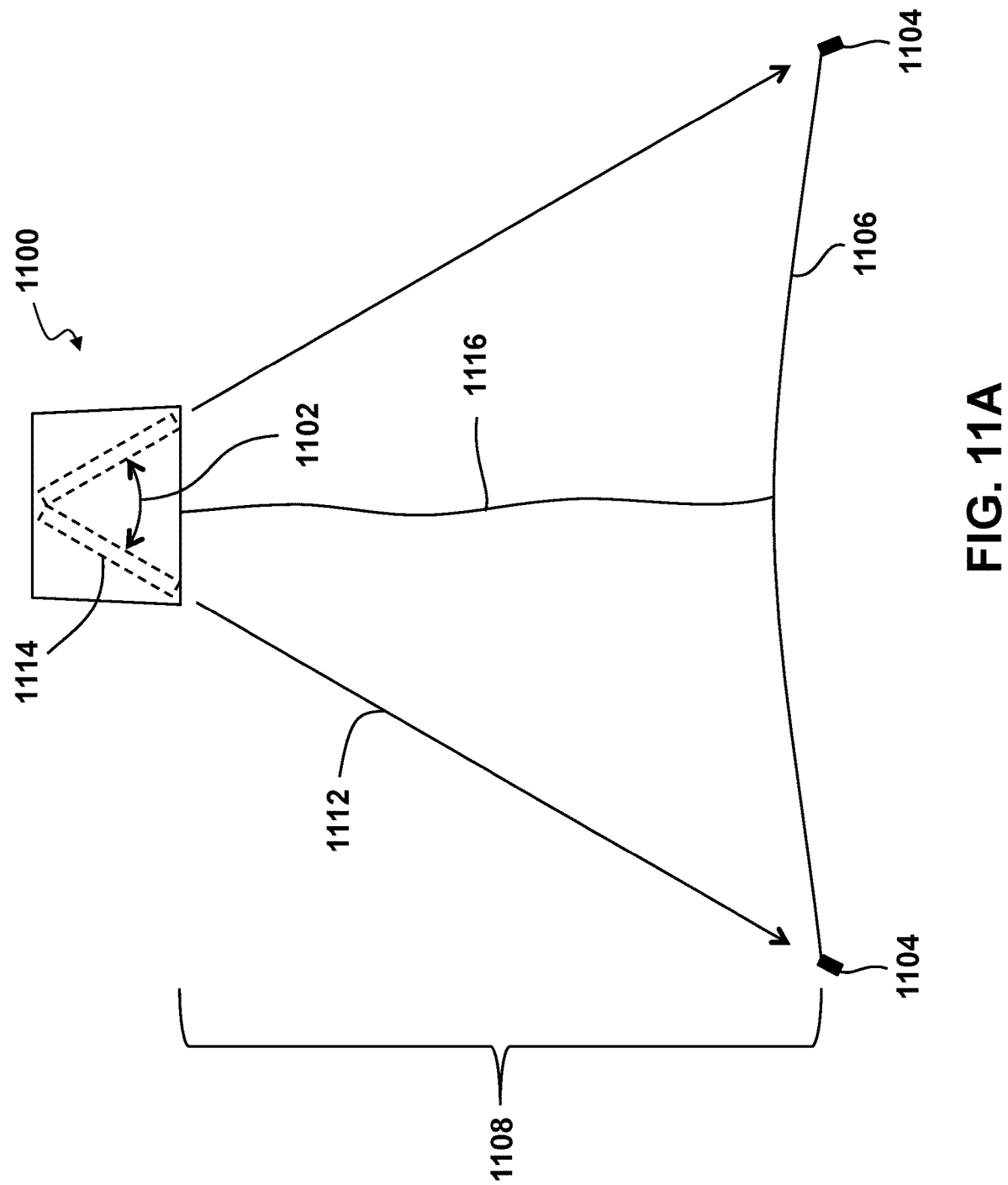
FIG. 11A depicts a deployment device with a narrower angle for weight release.
Figure 11B:
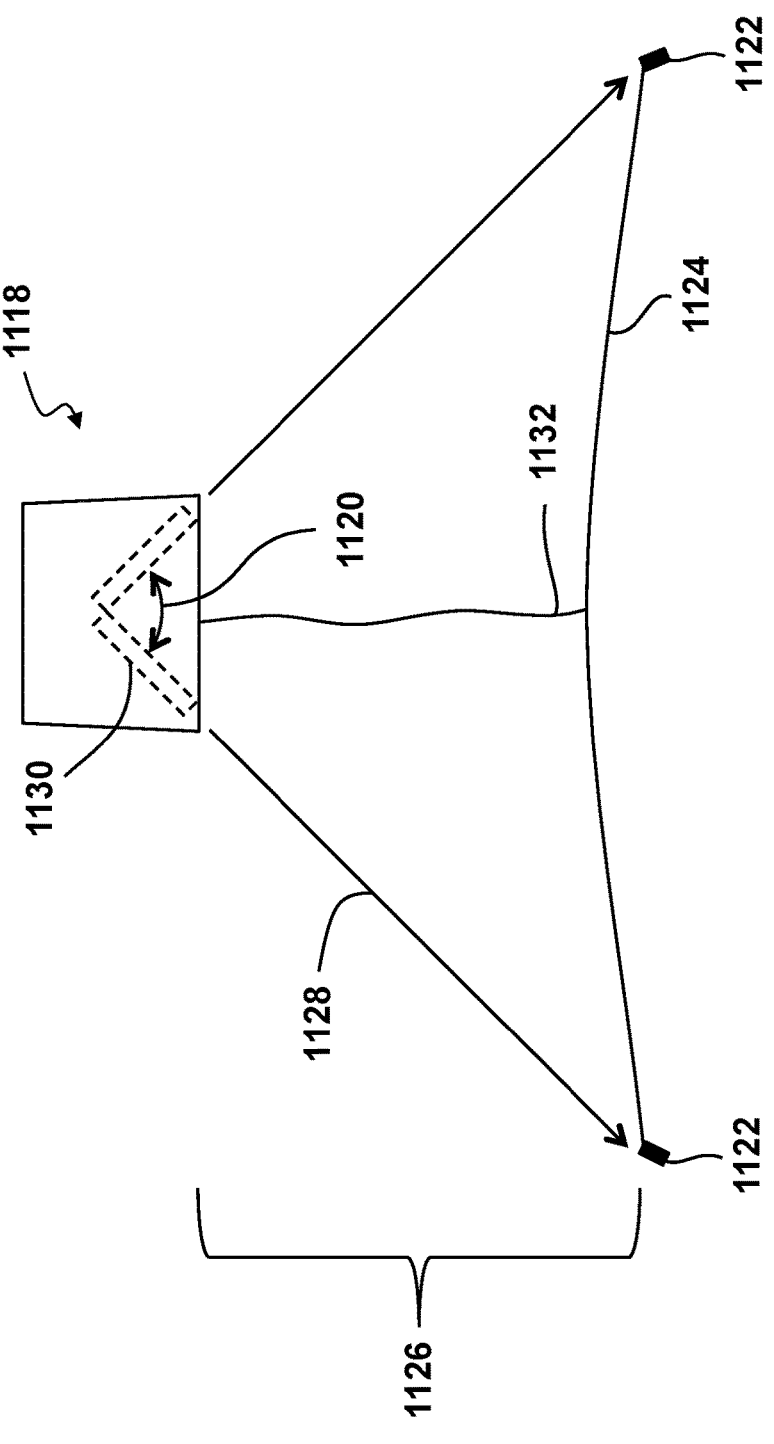
FIG. 11B depicts a deployment device with a wider angle for weight release.

The interceptor UAV 102 may carry one or more deployment devices 120, where in one embodiment the interceptor UAV 102 may carry two deployment devices 120. In the embodiment having multiple deployment devices 120, each deployment device 120 may have a different effector deployment force and/or a different angle for weights (136, FIG. 1E) to be released relative to the deployment device 120. For example, a narrower angle for the weight release may cause the effector to go a further distance from the deployment device 120 before opening up as compared to having a wider angle, as shown in FIG. 11A. A wider angle for the weight release may cause the effector to go a shorter distance from the deployment device 120 before opening up as compared to having a narrower angle, as shown in FIG. 11B. In some embodiments, the interceptor UAV may carry different deployment devices 120 with different sized effectors, different sized tethers, different weight release angles, and/or different effector deployment forces. Having different deployment devices 120 may allow an operator 106 of the GCS 114 to select the deployment device 120 to employ based on the target UAV 104 size, characteristics, distance from the interceptor UAV 102, wind, weather conditions, and the like. For example, the operator 106 may first attempt to capture the target UAV 104 using a deployment device 120 with a smaller effector size and shorter range. If the target UAV 104 is not captured or evades capture, the operator 106 may then deploy a second deployment device 120 with a larger effector size and longer range. The air vehicle of the interceptor UAV 102 may be capable of hovering flight and may be any of a variety of known and commercially available air vehicles, excluding the control system, such as a quadrotor UAV. Likewise, the threat or target UAV 104 may be a commercially available air vehicle capable of hovering.

Figure 1B:
FIG. 1B depicts an embodiment of the system of FIG. 1A with the interceptor UAV launched from a base station.
Figure 1B:
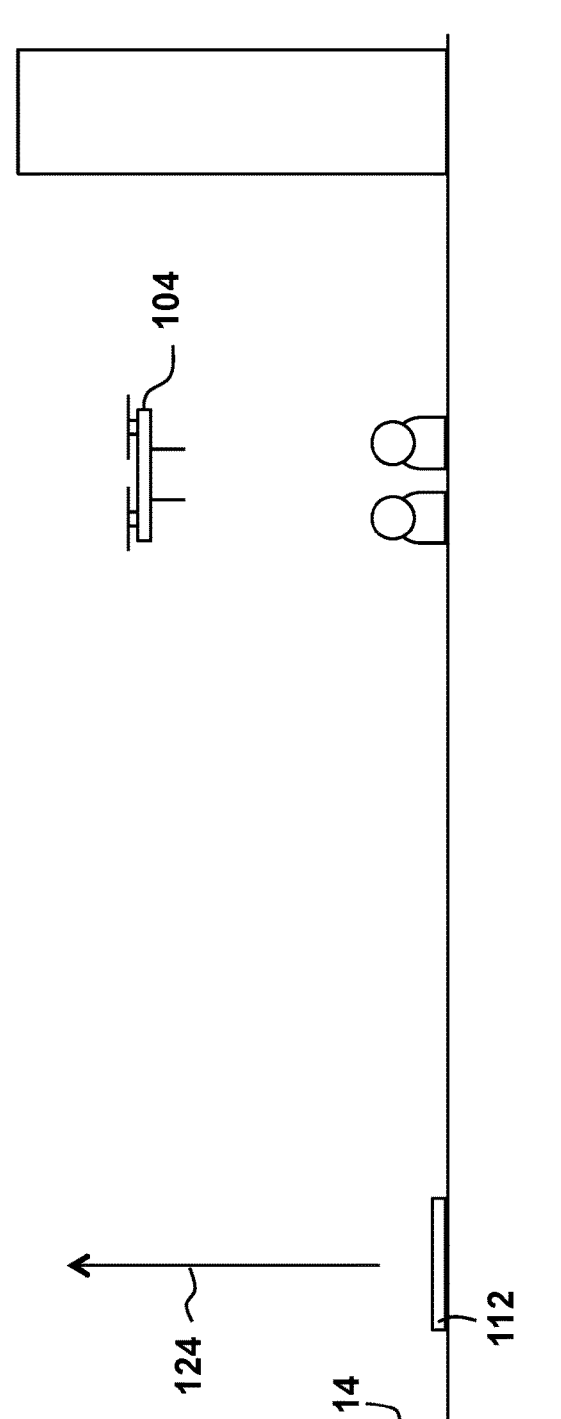

FIG. 1B depicts an embodiment of the system 100 of FIG. 1A with the interceptor UAV 102 launched 124 from the base station 112. The interceptor UAV 102 may be launched in any number of methods depending on the capability of the UAV, such as a human operator launch, an automatic queue via a cursor on target (CoT) message, or the like. Once the target UAV 104 is identified, the operator 106 may command the interceptor UAV 102 to launch via the GCS 114. The interceptor UAV may launch 124 vertically to a set height above the ground 122 or a height chosen by the operator 106 in the GCS 114. The interceptor UAV 102 may be a vertical take-off and landing (VTOL) UAV. In some embodiments, the interceptor UAV 102 may take-off horizontally, such as via a runway.

Figure 1C:
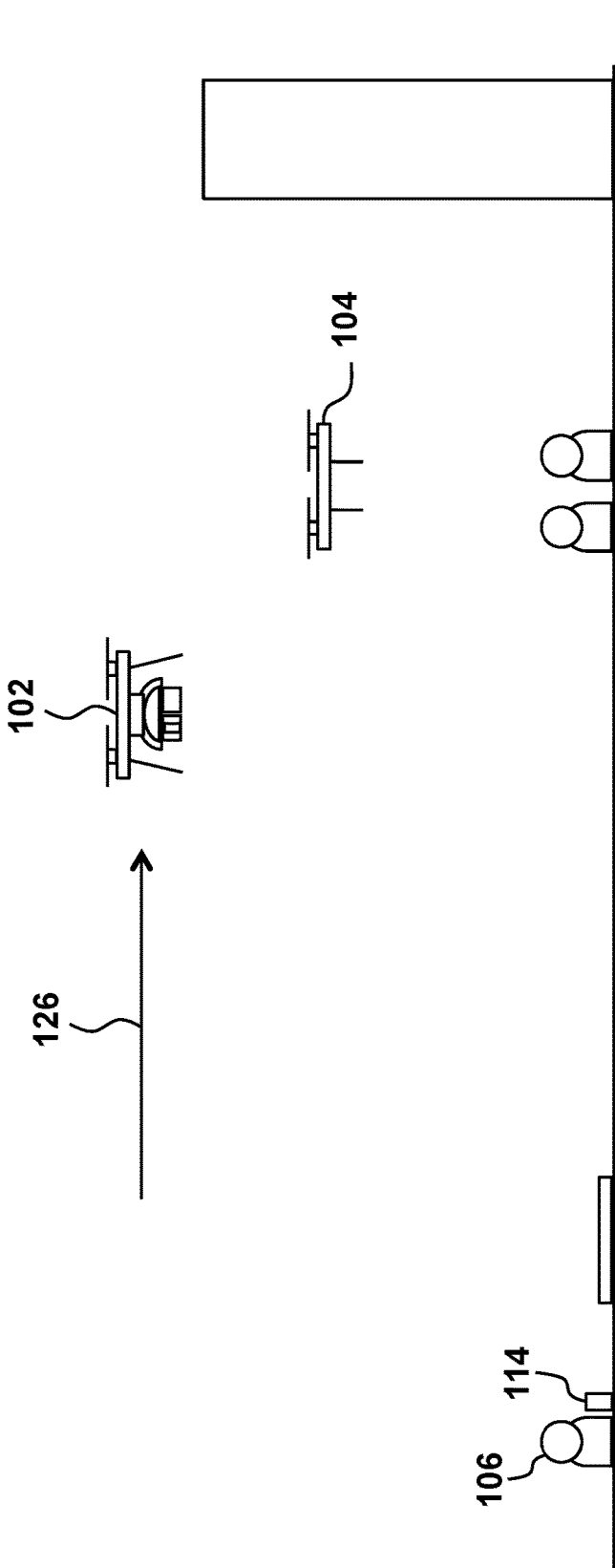
FIG. 1C depicts an embodiment of the system of FIG. 1A with the interceptor UAV maneuvering towards the target UAV.

FIG. 1C depicts an embodiment of the system 100 of FIG. 1A with the interceptor UAV 102 maneuvering 126 towards the target UAV 104. Once the interceptor UAV 102 reaches a set height, as shown in FIG. 1B, it may be flown horizontally away from the operator 106 and towards the target UAV 104. In some embodiments, the interceptor UAV 102 may automatically reach a set height and distance from the operator 106 and towards the target UAV 104, such as forty feet up and one hundred feet out. Once the interceptor UAV 102 reaches this location, the operator 106 may manually control the interceptor UAV 102 via the GCS 114 to reach the final desired location to intercept the target UAV 104. In other embodiments, the interceptor UAV 102 may be flown via autopilot to engage the target UAV 104.

In some embodiments, the system is automated so that the initial portions of the flight path of the interceptor UAV 102 may be performed by the automated system and not by the operator 106. Namely, the operator may deploy the interceptor UAV 102 by placing it on the ground in front of the operator and aim the interceptor UAV 102 at, or towards, the location of the target UAV 104. The system will then automatically take the interceptor UAV 102 off the ground, such as via vertical take-off or another take-off method, and fly it to a set predefined height and distance from the operator 106. While these pre-defined distances can vary, they may correspond to typical heights and ranges of previously encountered target UAVs 104. After the interceptor UAV 102 has been automatically flown to this predefined position, the operator 106 can then, if necessary, provide control inputs via the GCS 114 to further position the interceptor UAV 102 relative to the target UAV 104 as set forth herein.

Figure 1D:
FIG. 1D depicts an embodiment of the system of FIG. 1A with the interceptor UAV positioned over the target UAV.
Figure 1D:
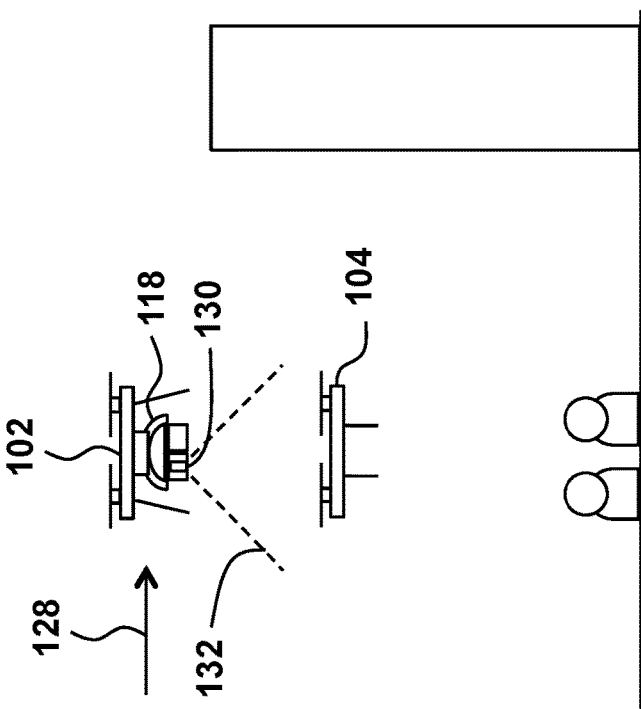
Figure 1D:
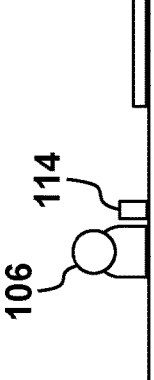

FIG. 1D depicts an embodiment of the system of FIG. 1A with the interceptor UAV 102 positioned 128 over the target UAV 104. Once the interceptor UAV 102 is near the target UAV 104 as in FIG. 1C, it may maneuver to be positioned 128 over the target UAV 104. A sensor and/or a capture device, such as a camera 130 having a field of view 132, may be fixedly or detachably attached to the gimbal 118. A video feed may be transmitted and viewed via a display of the GCS 114 by the operator 106. The video feed from the camera 130 may be used to position 128 the interceptor UAV 102 at a position to engage the target UAV 104. The operator 106 may select an auto-tracker via the GCS 114 to track a movement of the target UAV 104, as shown in FIG. 6C. As the target UAV 104 moves relative to the interceptor UAV 102, the gimbal 118 may track this movement such that the deployment device remains aimed at the target UAV 104. In one embodiment, the interceptor UAV 102 may automatically pursue the target UAV 104 until the interceptor UAV 102 is within range to engage the target UAV 104. The interceptor UAV 102 may enable a pursuit mode to automatically follow a selected target UAV 104 and reduce the distance between the interceptor UAV 102 and the selected target UAV 104.

Figure 1E:
FIG. 1E depicts an embodiment of the system of FIG. 1A with the interceptor UAV deploying an effector.
Figure 1E:
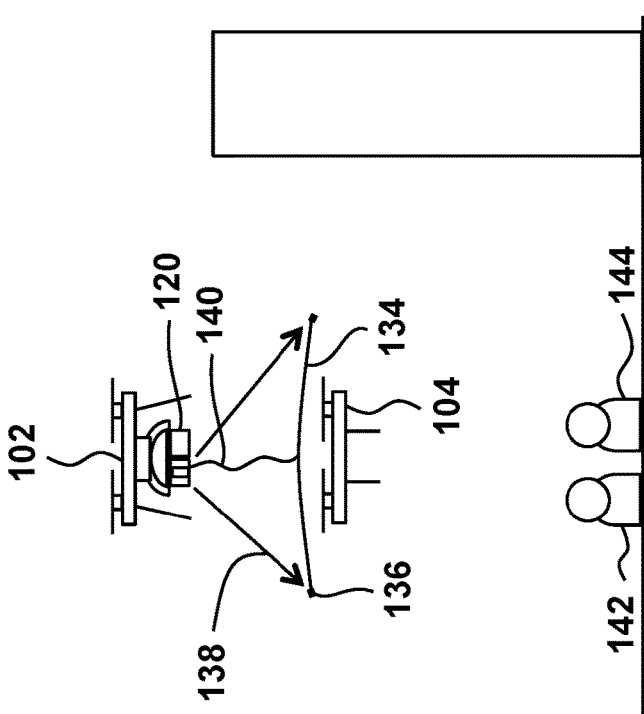
Figures 10A, 10B, 10C, 10D:
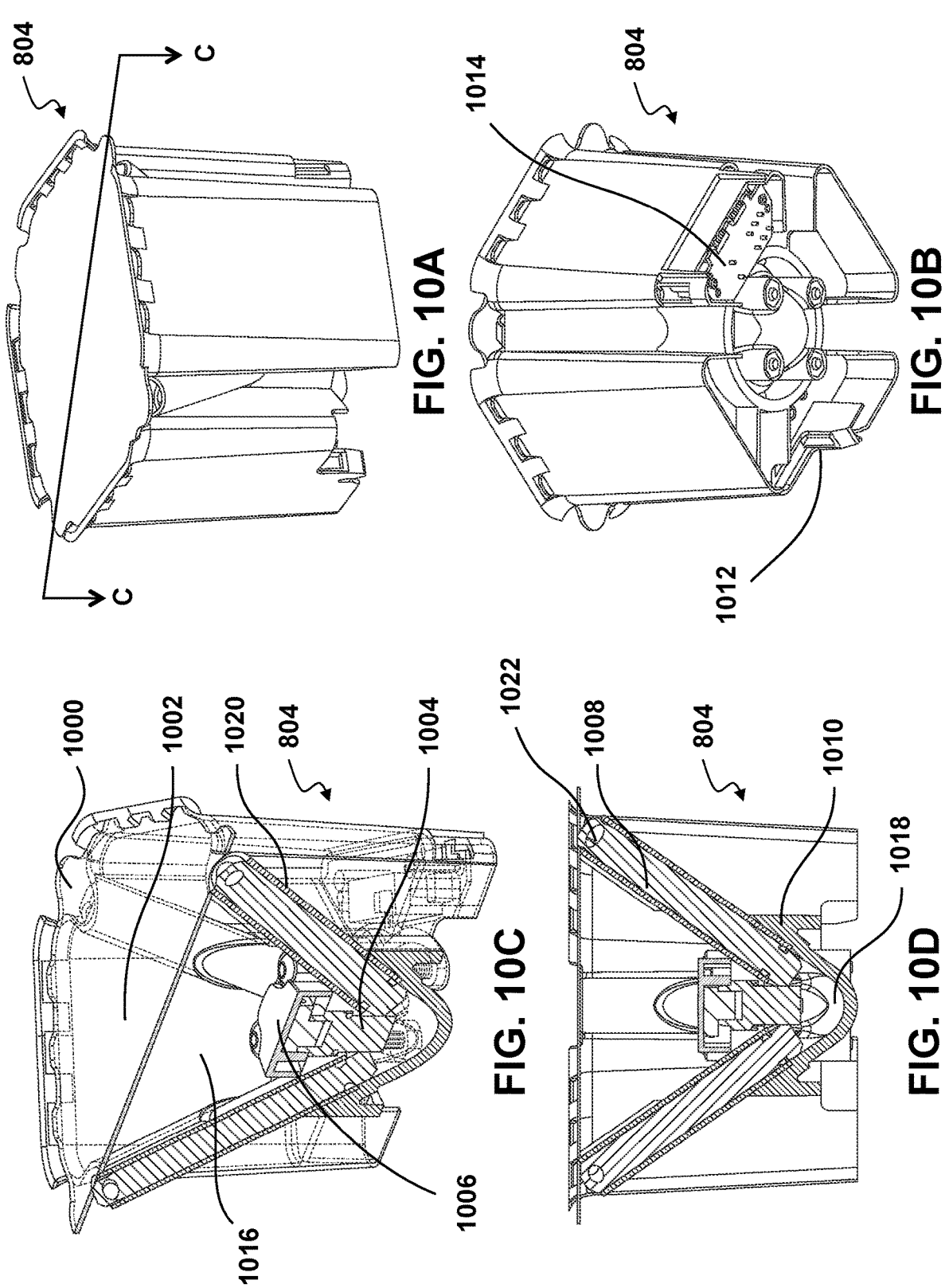
FIG. 10A depicts a perspective view of a deployment device.
FIG. 10B depicts another perspective view of the deployment device of FIG. 10A.
FIG. 10C depicts a perspective cross sectional view of the deployment device of FIG. 10A about line C-C.
FIG. 10D depicts a side cross sectional view of the deployment device of FIG. 10A about line C-C.

FIG. 1E depicts an embodiment of the system 100 of FIG. 1A with the interceptor UAV 102 deploying an effector 134. The operator 106 may deploy the effector 134 from the deployment device 120 via a user interface of the GCS 114. One or more predefined safety criteria may need to be met before the effector 134 is deployed. In one embodiment, the operator 106 may select a 'fire authority' control on the GCS 114 and an autofire mode of the interceptor UAV 102 may deploy the effector 134 once one or more conditions are met, such as safety conditions, distance between the interceptor UAV 102 and the target UAV 104, relative positions of the interceptor UAV 102 and the target UAV 104, and the like. The effector 134 may be a net having one or more slugs or weights 136 attached at the ends of the effector 134 to expand it. In one embodiment, the effector 134 may be a rectangular net with slugs attached to each corner. A gas generator may be trigged by a current, such as a 1 Amp current from a battery, to propel 138 each of the weights 136 in different directions to aid in ensuring that the effector 134 expands outward. The effector 134 may reach maximum expansion at a set distance, such as twenty feet from deployment. A tether 140 may connect the effector 134 to the deployment device 120 or gimbal. In embodiments where the tether 140 is connected to the deployment device 120, the deployment device 120 may be easily changed out or replaced by the operator 106 without requiring a change to the interceptor UAV 102 itself. In one embodiment, the deployment device 120 may include a snap interface at the base of the deployment device to snap into a corresponding interface on a base of the gimbal, as shown in FIG. 10B. In one embodiment, the deployment device may be snapped into the gimbal via the snap interface using one hand. Other suitable attachment methods may be used, such as magnets, snap-fit, interference fit, locks, bolts, and the like. One or more individuals 142, 144 or objects may be located underneath the target UAV 104. The tether 140 ensures that once the target UAV 104 is intercepted, the target UAV 104 does not fall down to the ground causing harm to an individual 142, 144 or damage to property. The tether 140 also allows the target UAV 104 to be captured intact so that information on the device or its operator, such as information stored in a processor or identification marks on an outside housing, may be obtained and analyzed at a later time. The tether 140 may be a high tensile strength nylon cord or other suitable material.

Figure 12:
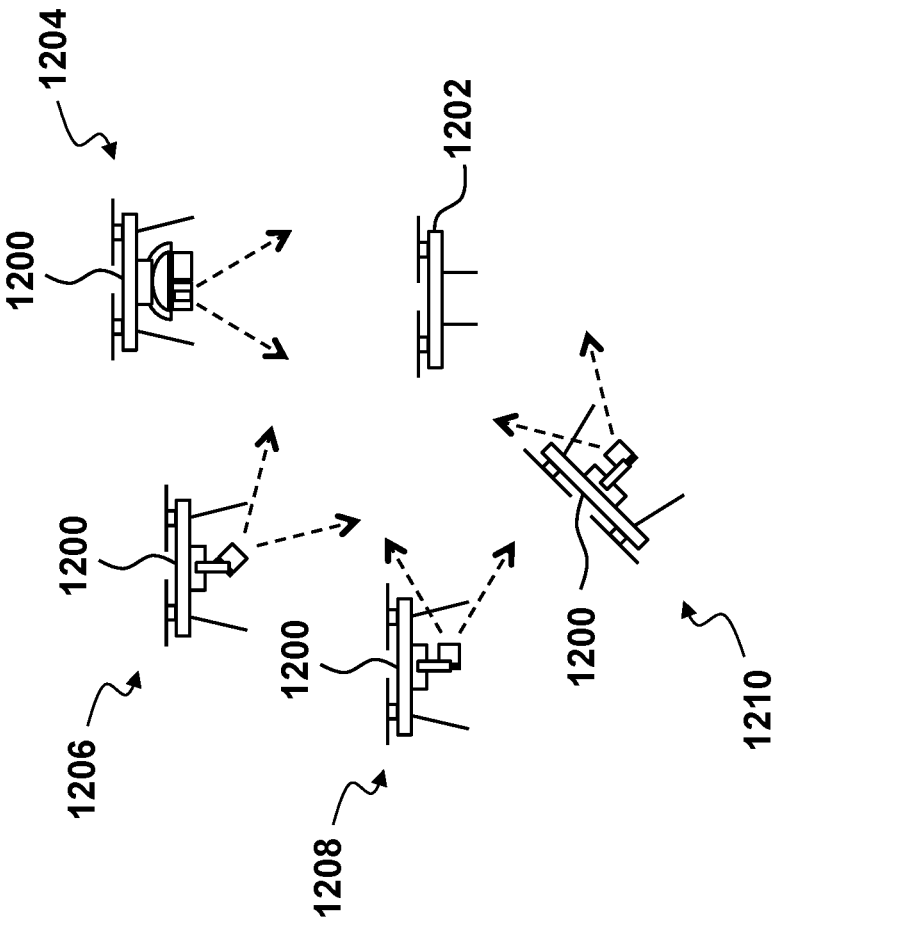
FIG. 12 depicts various positions of an interceptor UAV relative to a target UAV for engaging the target UAV.

While embodiments set forth herein have the interceptor UAV 102 positioned above the target UAV 104 to allow for deployment by gravity of the effector 134, the disclosed system and method encompasses embodiments where the interceptor UAV 102 may be in an alternate position relative to the target UAV 104, such as to the side of, behind, in front, and under, as shown in the different embodiments depicted in FIG. 12. In such embodiments, the effector 134 may have to be propelled towards the target UAV 104 by a device or means such as an explosive charge, a pressurized charge, rocket motor, or the like. In embodiments where the effector 134 is dropped down onto the target UAV 104, an effector propulsion device or means may not be needed to move the effector 134 towards the target UAV 104, which may reduce payload weight and/or allow for a larger effector 134, thereby increasing the likelihood of contact being made with the target UAV 104. Additionally, dropping the effector 134 straight down allows for easier determination of the trajectory of the effector 134, accounting for effects of wind, angle and movement.

The system 100 may also take into account one or more trajectory disturbances to make sure the effector 134 is properly aimed at the target UAV 104 and deployed at the right time to increase the likelihood of capturing the target UAV 104. The trajectory disturbances may include an attitude angle of the interceptor, i.e., the gimbal-mounted deployment devices 120 always "point towards" or in the direction of location of the target UAV 104; the distance between the interceptor UAV 102 and the target UAV 104, i.e., the system 100 may wait until the target UAV 104 is within the length of the tether 140 that is attached to the effector 134; the speed of the interceptor UAV 102, e.g., the system may increase the "lead angle" at higher interceptor UAV 102 speeds; wind speed and direction; and/or other possible conditions or factors attributing to a disturbance of the trajectory. In one embodiment, the disturbances may be further detected by using multiple sensors for real-time sensor readings and processing data received from such sensors.

Figure 1F:
FIG. 1F depicts an embodiment of the system of FIG. 1A with the target UAV captured in the effector.
Figure 1F:
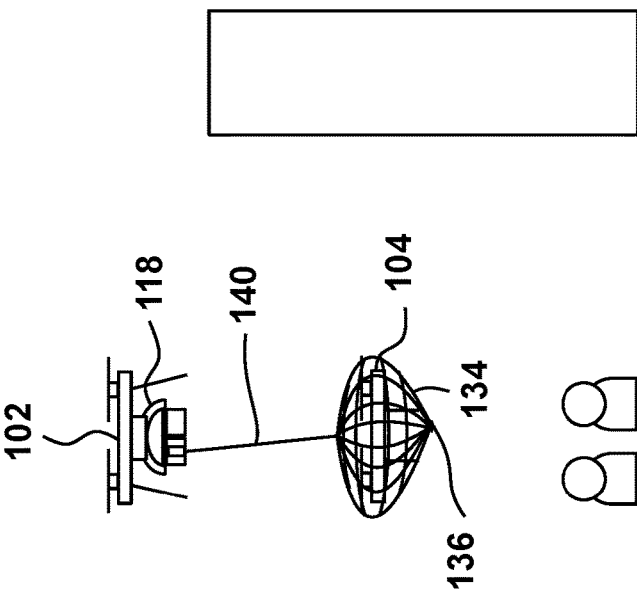
Figure 13A:
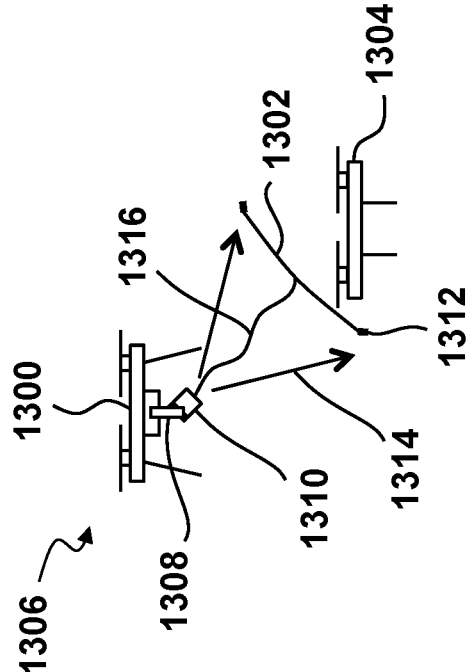
FIG. 13A depicts an embodiment of an aerial vehicle intercept system having an interceptor UAV deploying an effector towards a target UAV.
Figure 13B:
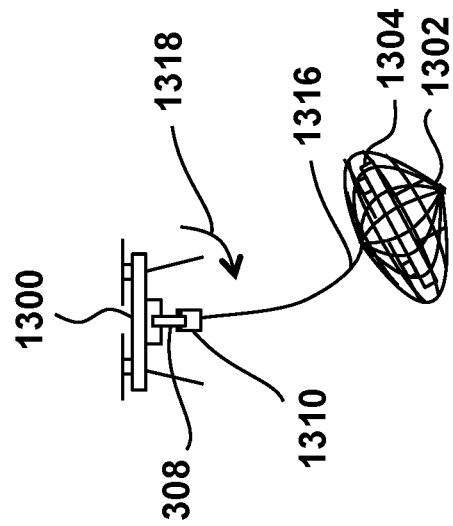
FIG. 13B depicts an embodiment of the system of FIG. 13A with a gimbal rotated to a downward position once the effector is deployed.

FIG. 1F depicts an embodiment of the system 100 of FIG. 1A with the target UAV 104 captured in the effector 134. The effector 134 wraps around the target UAV 104 as the weights 136 close the effector 134. The effector 134 disables or inhibits movement of the target UAV 104. In some embodiments, the effector 134 may disable the target UAV's 104 propulsion system. The gimbal 118 may provide, for example, a 2-axis rotation so that the gimbal may rotate to a downward position once the effector 134 is fired such that the gimbal 118 is facing downward when the tether 140 catches the weight of the intercepted target UAV 104, as shown in FIGS. 13A-13B. This positioning of the gimbal 118 minimizes forces on the interceptor UAV 102 that may cause the interceptor UAV 102 to dip towards the ground 122 or otherwise lose control. A change of position of the interceptor UAV 102 as the effector 134 intercepts the target UAV 104 and the interceptor UAV 102 is pulled down by the force of the captured target UAV 104 may be determined and used to confirm that the target UAV 104 has been captured. In one embodiment, the tether 140 may be a set length, such as forty feet. In other embodiments, the tether 140 may have an adjustable length. The adjustable length may be determined at the time of deployment. The tether 140 may be made from light weight material, e.g., nylon to minimize weight. Metal or other materials may be used for the tether 140 and/or effector 134 in other embodiments. If the effector 134 does not capture the target UAV 104, such as if a strong wind alters the deployment of the effector 134 or the target UAV 104 takes evasive action, a subsequent deployment device may be deployed to intercept the target UAV 104.

Figure 1G:
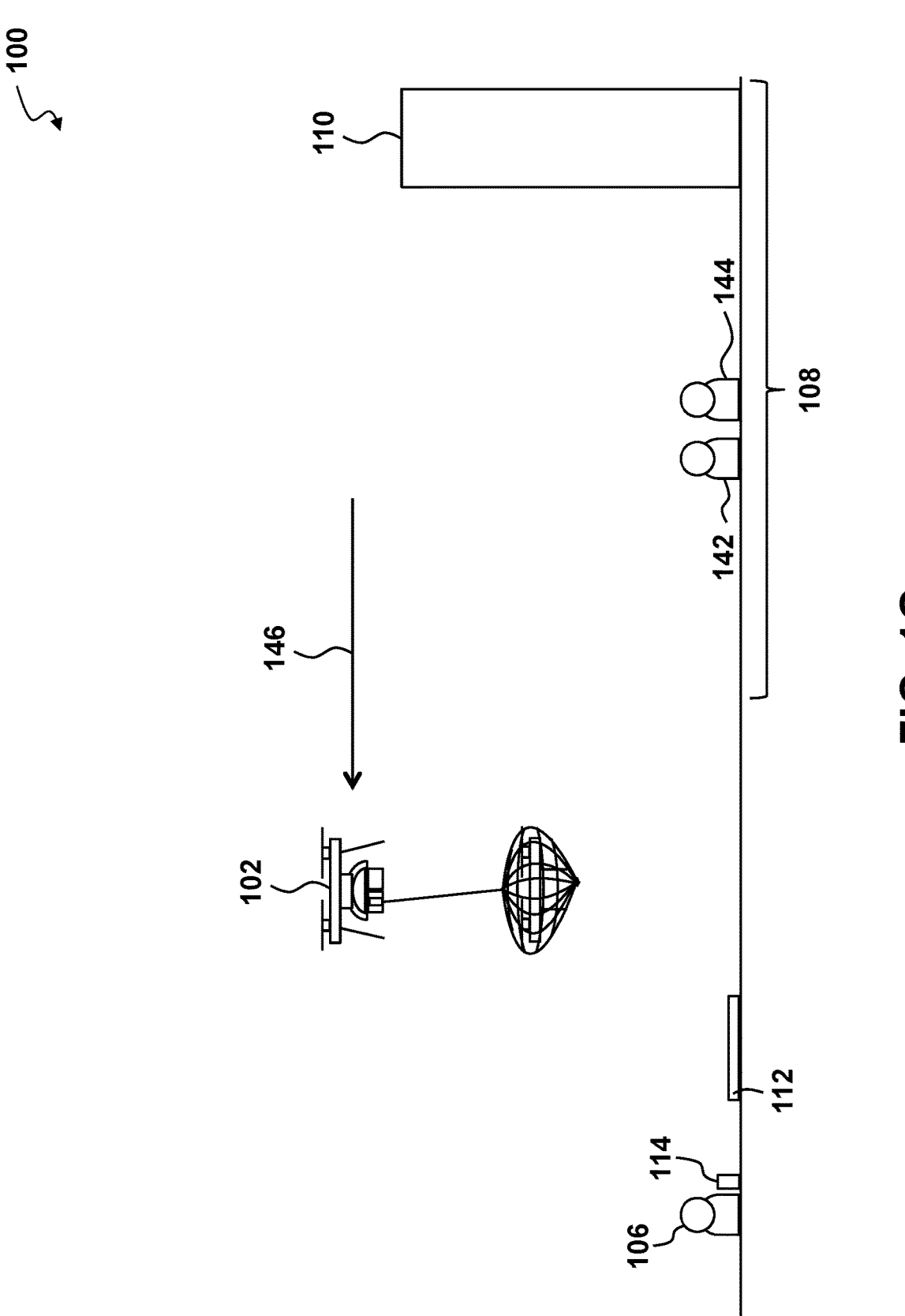
FIG. 1G depicts an embodiment of the system of FIG. 1A with the interceptor UAV maneuvering towards the base station.

FIG. 1G depicts an embodiment of the system 100 of FIG. 1A with the interceptor UAV 102 maneuvering 146 towards the base station 112. Once the target UAV is intercepted, the interceptor UAV 102 may maneuver 146 toward the operator 106, base station 112, or other desired location that is away from the geographic area 108, individuals 142, 144 on the ground, building 110, or other location. The operator 106 may control direction and/or flight path of the interceptor UAV 102 via the GCS 114. In other embodiments, the interceptor UAV 102 may return after deployment to a set position via an autopilot.

Figure 1H:
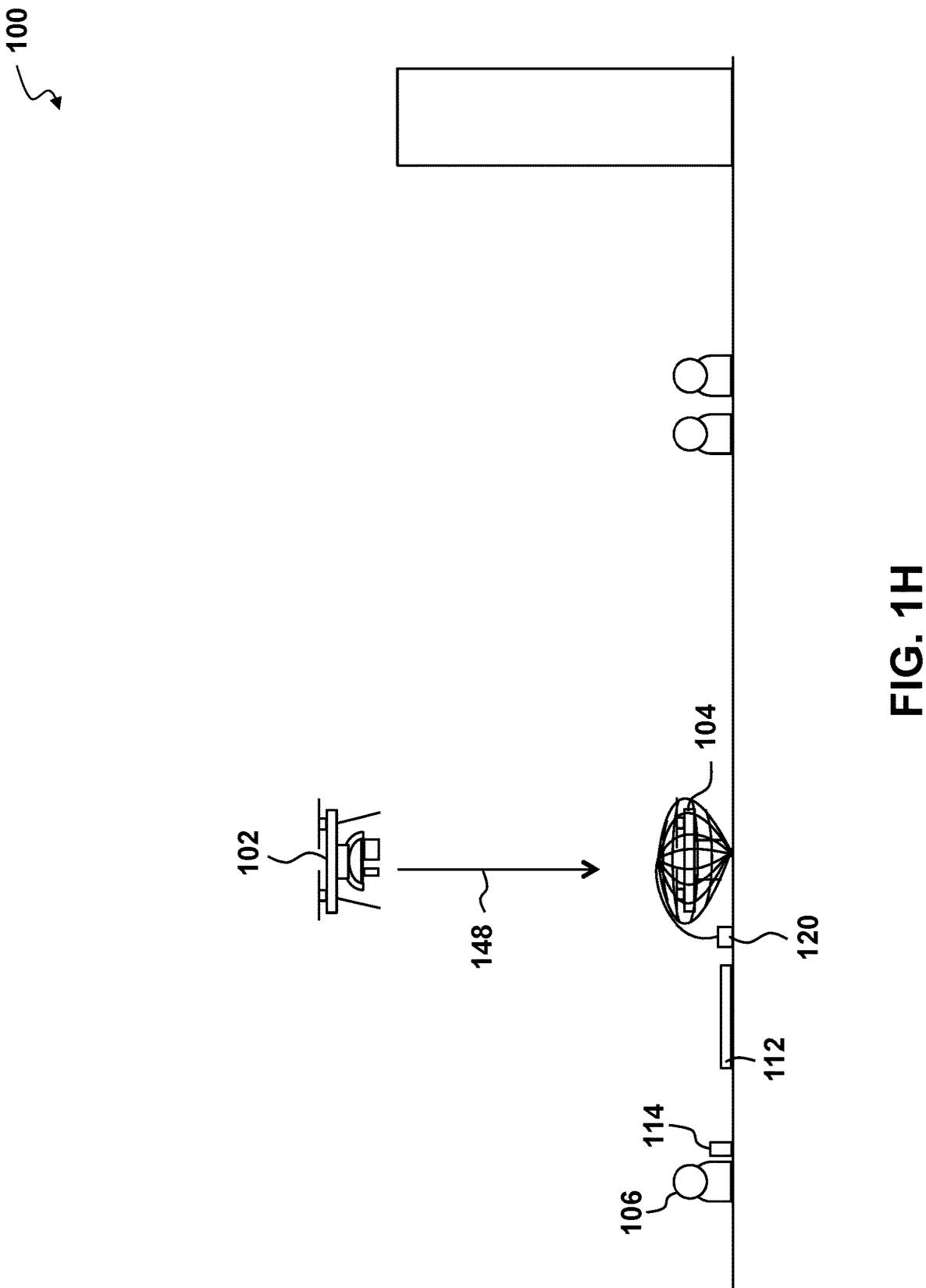
FIG. 1H depicts an embodiment of the system of FIG. 1A with the captured target UAV released by the interceptor UAV.

FIG. 1H depicts an embodiment of the system 100 of FIG. 1A with the captured target UAV 104 released 148 by the interceptor UAV 102. The captured target UAV 104 may be released 148 via the user interface of the GCS. In other embodiments, the interceptor UAV 102 may land and the operator 106 or another individual may detach the deployment device 120. In some embodiments, attachment or detachment of the deployment device 120 may be accomplished remotely via the base station 112. The captured target UAV 104 may be placed in a predetermined location. The predetermined location may allow an individual to perform forensic analysis and determine the target UAV 104 origin and vulnerabilities. The predetermined location may also allow for control of a potential weapon of the target UAV 104, such as chemical, biological, nuclear, radiological, and explosive (CBNRE). The predetermined location reduces or eliminates the need for an individual to search for in order to find and retrieve an intercepted target UAV 104. Thereby, having a predetermined location associated with the target UAV 104 provides an automated retrieval mode option to a user of the interceptor UAV 102, e.g., on a user interface of the GCS 114, including the predictability of where the target UAV 104 will be placed after being captured. In one embodiment, the interceptor UAV 102 may place the captured target UAV within a predetermined location based on factoring in wind estimate, reducing the tether length, and/or enabling a control loop to sense the tether swinging and limit the amplitude of the swinging.

Figure 1I:
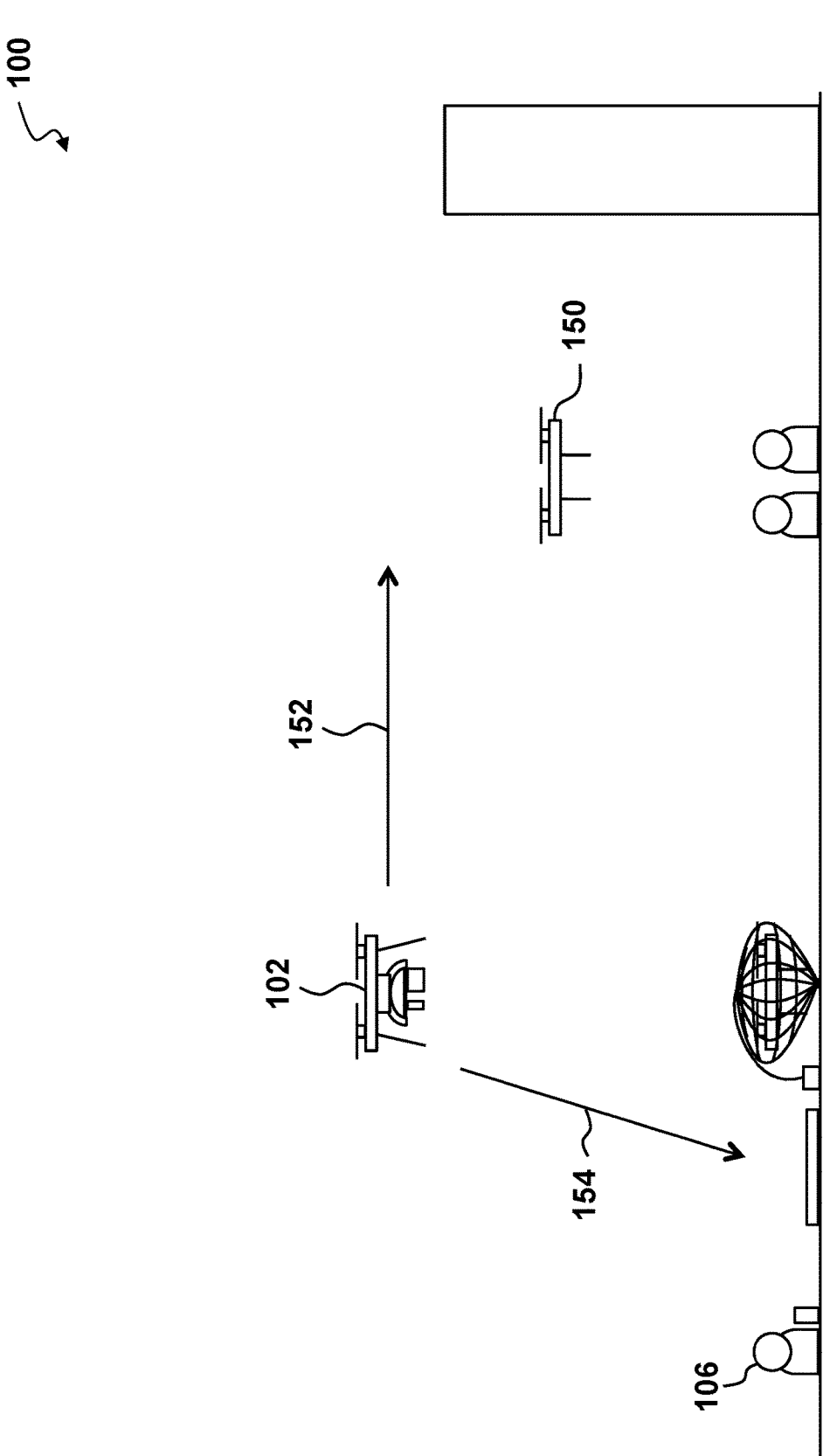
FIG. 1I depicts an embodiment of the system of FIG. 1A with a second target UAV identified.

FIG. 1I depicts an embodiment of the system 100 of FIG. 1A with a second target UAV 150 identified. If an additional target UAV 150 is identified, the interceptor UAV 102 may continue to intercept each target UAV 150 until all deployment devices 120 are used. The operator 106 may detachably detach used deployment devices 120 and detachably attach new deployment devices 120 to the gimbal of the intercept UAV 102. The operator 106 may then command the intercept UAV 102 to maneuver towards 152 the additional target UAV 150 or land 154 to add additional deployment devices 120. In some embodiments, the decision to engage 152 a new target UAV 150 or land 154 may be controlled by an autopilot and based on remaining deployment devices 120, battery level, wind conditions, and/or other factors affecting the flight operations.

Figure 2:
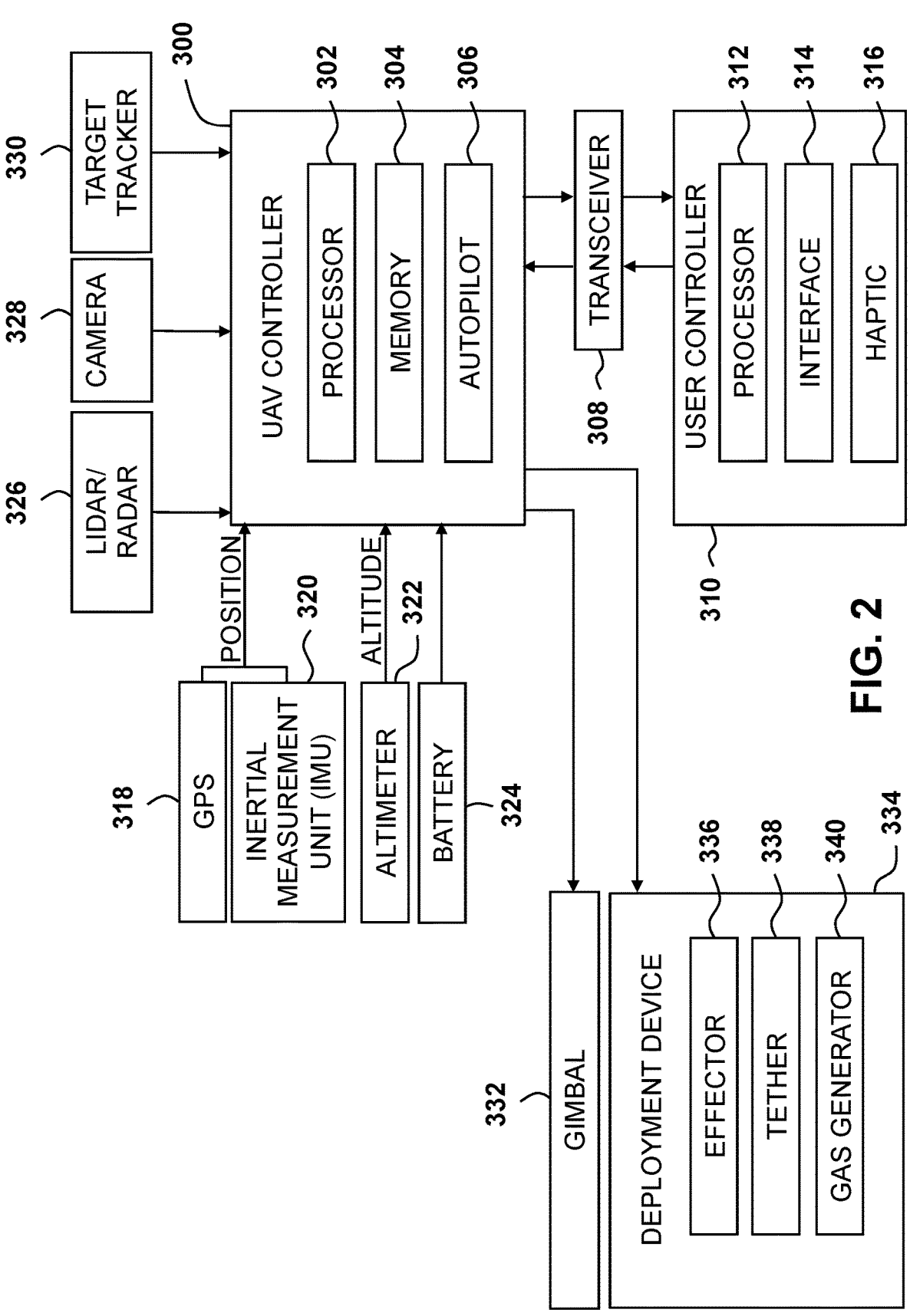
FIG. 2 depicts a UAV controller having a processor with addressable memory.

FIG. 2 depicts a UAV controller 300 having a processor 302 with addressable memory 304. The UAV controller 300 may be an independent device or integrated with an existing UAV controller used to control movement and operations of the UAV. An autopilot 306 may be used to automate some, or all, of the UAV flight controls. In some embodiments, the UAV controller 300 may send and receive signals via a transceiver 308 in communication with a user controller 310, such as a ground control system (GCS). In other embodiments, the transceiver may be replaced with separate transmitters and receivers.

The user controller 310 may include a processor 312 with addressable memory and a user interface 314 to allow control of an interceptor UAV by a user or operator. The user interface 314 may include a display, one or more buttons, one or more joysticks, lights, a voice user interface, or other inputs to control the interceptor UAV. In some embodiments, the user controller 310 may include haptic feedback 316, such as a vibration, to inform the user when an action has been accomplished. The haptic feedback 316 may cause the user controller 310 to vibrate when the interceptor UAV successfully captures a target UAV and the weight of the target UAV causes the interceptor UAV to pull down. This haptic feedback 316 may provide additional confirmation to the user or operator of the user controller 310 that an action has successfully occurred or failed to occur.

The UAV controller 300 may receive input from a global positioning system (GPS) 318 and inertial measurement unit (IMU) 320 to determine the interceptor UAV position. An altimeter 322 input may be used by the UAV controller 300 to determine attitude of the interceptor UAV. The position inputs (318, 320) and altitude input 322 may be used to determine, by the processor 302 of the UAV controller 300, the interceptor UAV position. A battery 324 may be used to power the UAV controller 300 and/or one or more systems or propulsion devices of the interceptor UAV.

The UAV controller 300 may also receive input on the target UAV from a ranging system 326, such as LIDAR or RADAR; a sensor 328, such as a camera; and/or a target tracker 330, such as an auto-tracker. In some embodiment, the UAV controller 300 may receive target UAV positioning information from one or more outside sources. These outside sources may include external radars that are ground based, external camera systems, and the like. These outside sources may send the target UAV position via a wireless communication link from the GCS 310 or from the outside source directly through an additional wireless communication link. The target UAV positioning information from the outside sources may be sent to the interceptor UAV via a standardized message protocol. This information may then be automatically used to augment its onboard sensors and better command the interceptor UAV itself towards the target UAV. In one embodiment, the ranging system 326 may be used to determine a distance from the interceptor UAV to the target UAV so that an operator of the user controller 310 or an autopilot 306 of the UAV controller 300 may determine when to release an effector 336 of a deployment device 334. The effector 336, such as a net, may be connected to the deployment device via a tether 338. When triggered by the user interface 314 or autopilot 306, a gas generator 340 may propel one or more weights of the effector 336 out in different directions to open up the effector 336 so that the effector 336 contacts the target UAV. A gimbal 332 mounted to the interceptor UAV may be used to angle the deployment device 334 towards the target UAV. The gimbal 332 may be positioned straight down towards the ground, but may be angled so as to fire the deployment device 334 at angles up to about ninety degrees from vertical, i.e., substantially parallel to the ground.

In one embodiment, the target tracker 330 may be a camera vision-based tracker. In another embodiment, the target tracker 330 may include one or more object detection devices, such as RADAR, LIDAR, or the like. The interceptor UAV may include one or more miniature RADAR or LIDAR devices to detect and track targets. The interceptor UAV may be in communication with ground unites providing RADAR or LIDAR detection and processing where data may be uploaded to the interceptor UAV and processed by the interceptor UAV for tracking a target.

An image capture device, for example, a camera 328 may be attached to the gimbal 332 so as to provide a video feed at real-time or near real-time to the user interface 314, which may be used to aim and fire the effector 336 at the target UAV. In some embodiments, the target tracker 330 may be activated via the user interface 314 or autopilot 306 to track the position of the target UAV and move the gimbal 332 and/or interceptor UAV to maintain the target UAV within range and angle to deploy the effector 336 and intercept the target UAV.

Figure 3:
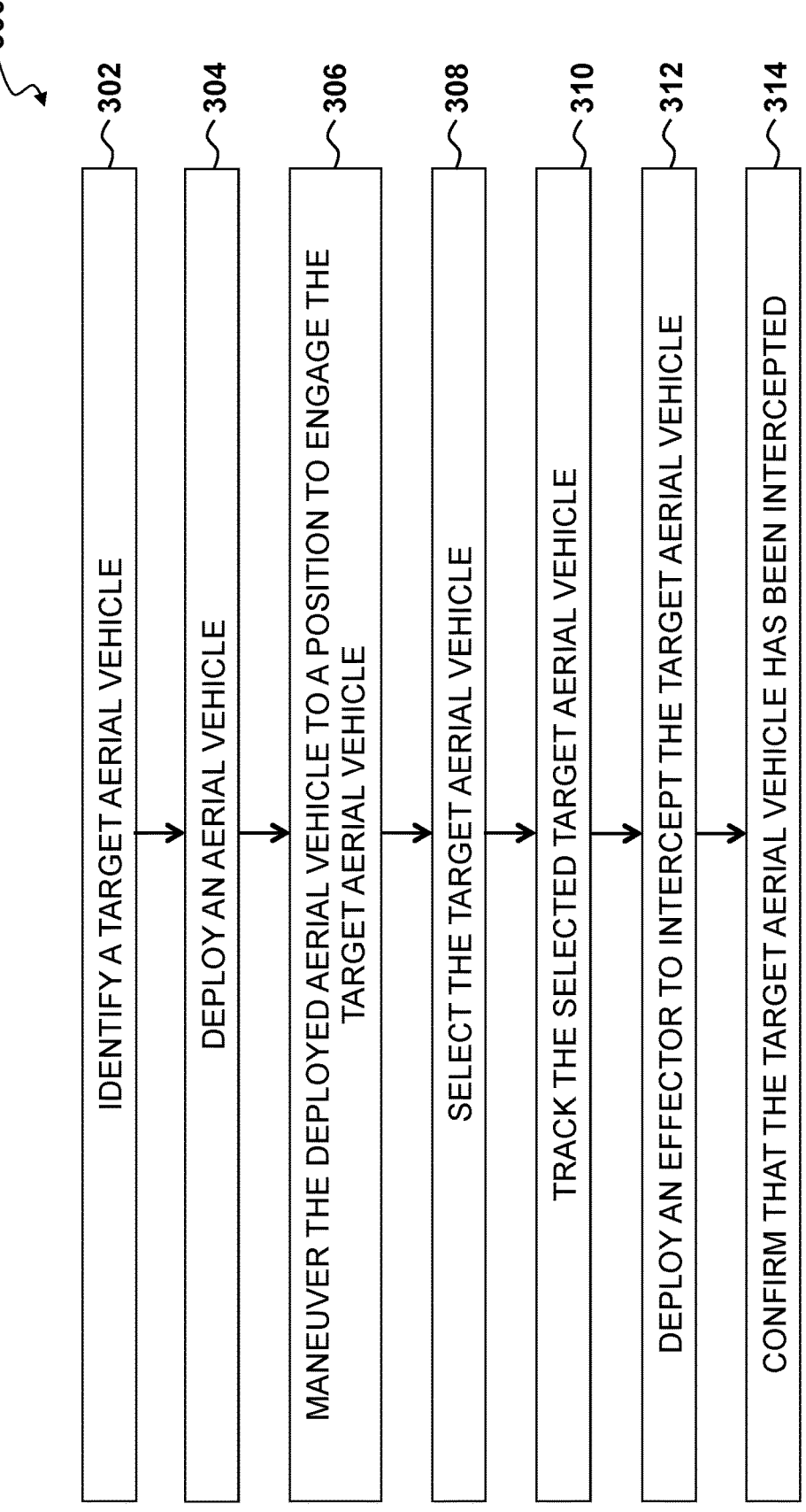
FIG. 3 depicts a functional block diagram of a method embodiment for intercepting a target aerial vehicle with an interceptor aerial vehicle.

FIG. 3 depicts a functional block diagram of a method embodiment 300 for intercepting a target aerial vehicle with an interceptor aerial vehicle. First, a threat such as a target aerial vehicle is identified (step 302). The target aerial vehicle may be a UAV. In some embodiments, elaborate support systems, such as RADAR, LIDAR or the like, may not be needed to provide positioning information. The system may instead utilize, at least in-part, the operator's, or other observers', vision to identify and track the threat by simple direct visual means. The operator may also use one or more on-board cameras to identify the threat UAV.

An aerial vehicle, such as an interceptor UAV, is depicted as deployed (step 304), where an operator may manually deploy the intercept UAV. In some embodiments, an auto-pilot may deploy the UAV to a set height and distance from the operator, e.g., forty feet from the ground and one hundred feet from the operator.

The aerial vehicle is maneuvered to a position to engage the target aerial vehicle (step 306). A remote operator may maneuver the interceptor UAV via a controller, such as a ground control station (GCS), to a position to intercept the target UAV. In one embodiment, the interceptor UAV may be positioned to be directly above the target UAV. The interceptor UAV may be controlled to be movable towards and away from the operator and about an arc of substantially constant radius from the operator. The operator may use direct visual observation of the interceptor UAV and the target UAV to maneuver the interceptor UAV, by a control-ler, to a position relatively near the target UAV. The operator may use imagery from a camera on the interceptor UAV to maneuver the interceptor UAV to a position where the effector may be deployed towards the target UAV.

To simplify the operation of the interceptor and thus eliminate the requirement for a highly trained operator, the interface of the system may utilize control inputs set in relative directions to the operator's position or point of view, e.g., left, right, up, down, and the like. That is, the guidance of the interceptor may be given from the operator's own visual reference point. For example, 'go up' or 'go down'; 'go away from me' or 'go towards me'; and/or 'go to my right' or 'go to my left'. In this manner with such relatively simple instructions, an untrained operator can easily "walk" or move an interceptor UAV to the location of their choos-ing. As such, the disclosed system eliminates or substantially reduces the need for the target UAV's detailed GPS location and trajectory, piloting skills, understanding of aircraft flight dynamics, or any complex navigation knowledge. This disclosed control system allows for more available operators and quicker reaction to the threat of a target aerial vehicle.

The target aerial vehicle may be selected (step 308) via the operator selecting the target UAV on a display of a GCS to ensure that the correct vehicle is identified and selected. The GCS may display a video feed from a camera mounted on the gimbal of the interceptor UAV. Once the target UAV is visible in this video feed, the operator may select the target UAV to ensure that the correct target is selected. In some embodiments, an autopilot may automatically select the target UAV based on set criteria.

In some aspects of the interception and countering UAV embodiments, the selected target aerial vehicle may be tracked (step 310). An auto-tracker may be used to track the movement of the target UAV that was selected. The auto-tracker may maneuver the UAV and/or a gimbal mounted on the UAV to keep the target UAV within range of the interceptor UAV. The operator may maneuver the UAV to stay near the target UAV while the auto-tracker may maneu-ver the gimbal to remain locked-on to the target UAV.

An effector may be deployed by the interceptor UAV to intercept the target aerial vehicle (step 312). Dropping an effector, such as a net, tarp, or the like, may intercept the target UAV. The effector may include one or more weights disposed about the perimeter or corners of the effector. The weights may be propelled out from the deployment device at different angles to open up the effector and increase its surface area. The weights may also ensure that the effector closes about the target UAV and immobilizes it. A tether may be attached between the deployment device and the effector to ensure that the target UAV does not impact the ground and cause damage to any individuals or property on the ground.

In one embodiment, confirmation that the target aerial vehicle has been intercepted may be determined and com-municated (step 314). In some embodiments, the autopilot may confirm whether the target UAV has been intercepted. In other embodiments, the operator may visually confirm whether the target UAV has been intercepted. In some embodiments, the controller may have haptic feedback. When the target UAV is captured and the effector pulls on the tether connected to the interceptor UAV, the controller may receive a signal from the interceptor UAV to vibrate and signify this action. The operator may then use both visual and haptic feedback to confirm that the target UAV has been intercepted.

Figures 4A, 4B, 4C, 4D:
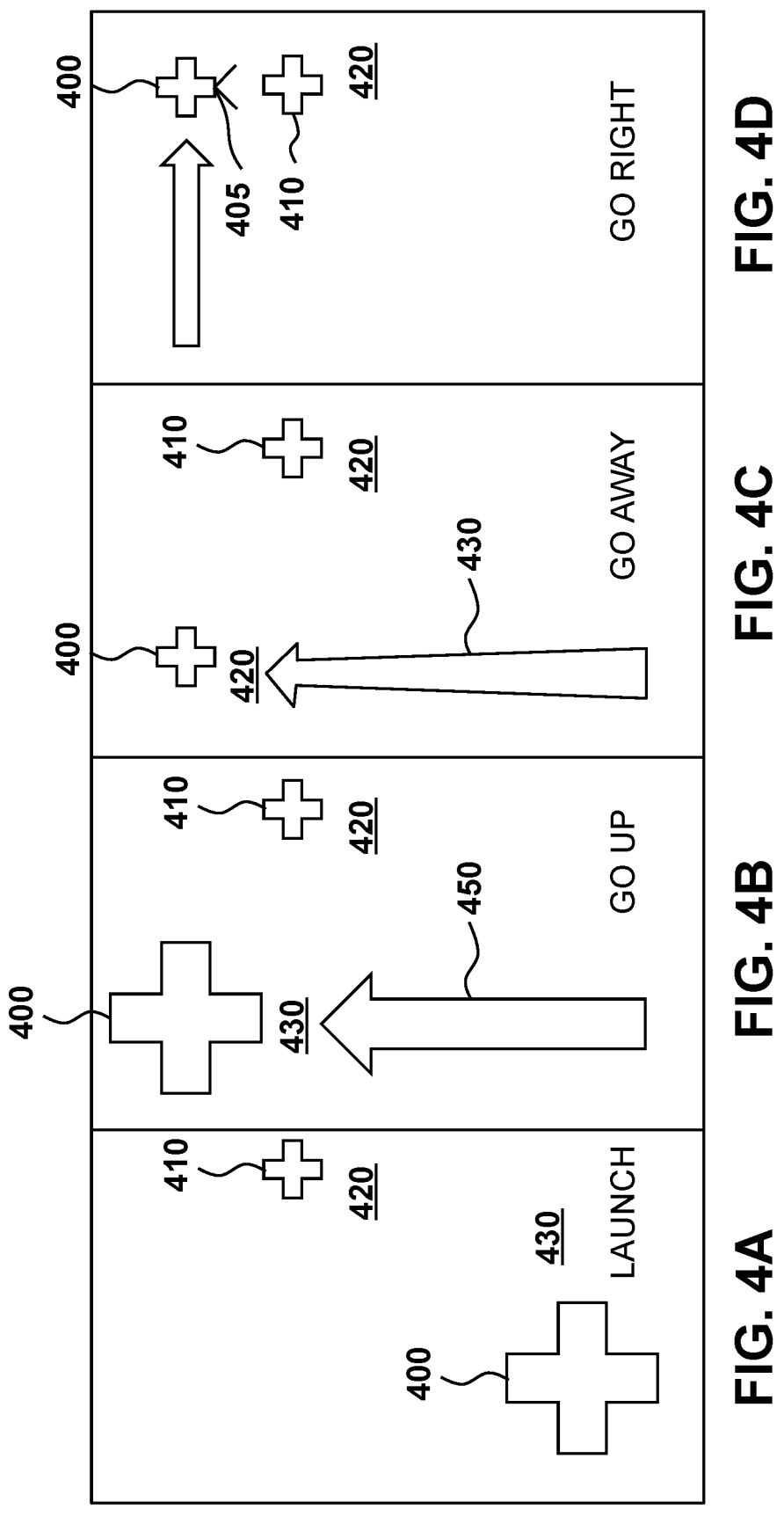
FIGS. 4A-4D depict schematic representations of a user's field of view as the operator commands an interceptor UAV to a desired position to engage a target UAV.

FIGS. 4A-4D depict schematic representations of a user's field of view as the operator commands an interceptor UAV 400 to a desired position to engage a target UAV 410. The operator commands the interceptor UAV 400, depicted as a cross, to a desired position. As shown in FIG. 4A, the operator first identifies the target UAV 410, which is depicted as a cross, flying above and away from the opera-tor's position in the background 420. The interceptor UAV 400 is depicted as lower on the ground in the foreground 430. In this example, the two UAVs 400, 410 have relatively the same physical size, with the difference shown being attributable to the distance from the operator.

In FIG. 4B, the operator has launched the interceptor UAV 400 vertically so that the UAV is now hovering above the foreground 430 and as such still appears larger than the target UAV 410. This interceptor UAV 400 launch is achieved by the operator providing a command to direct the interceptor UAV in a direction relative to the operator, namely, up 450. In some embodiments, the operator's com-mand to the interceptor UAV's 400 interface is 'go up', 'up', or the like. In other embodiments, the operator's command is pressing an up-shaped arrow or other such symbol or by use of a joystick controller.

FIG. 4C shows the operator providing a relative command to move the interceptor UAV 400 from the foreground 430 to the background 420. The command may be 'out', 'out-ward', 'away', 'go away', 'in', 'inward', 'move back', or the like. The command may also be an arrow on the user interface pointing away from the operator. The operator may use his or her view to generally position the interceptor UAV 400 at or near the distance away from the operator as the target UAV 410 is located from the operator. This may be accomplished by moving the interceptor UAV 400 until the interceptor UAV appears to be about the same physical size as the target UAV 410. If the two UAVs are not the same physical size, adjustments could be made by the operator with known or suspected differences in the sizes of the respective air vehicles.

After the interceptor UAV 400 has been moved to the perceived relative height and distance away from the opera-tor, the final maneuver may be accomplished. As shown in FIG. 4D, the operator moves the interceptor UAV 400 sideways until it positioned above the threat UAV 410. This sideways motion can simply be the UAV moving in a direction parallel to its prior travel away from the observer, which will initially seem to be a right or left motion relative to the operator, however over some distance a component of the movement away from the operator may continually increase until directing the UAV right or left will be almost entirely producing a relative 'away' or 'come back' motion.

The various actions used in the process of the operator moving the interceptor UAV 400 to the target UAV 410 may be taken in different order. For example, the operator could align the interceptor UAV 400 above the target UAV 410, as shown in FIG. 4D before the operator moves the interceptor UAV 400 away, as shown in FIG. 4C. Also, multiple adjustments to the interceptor UAV 400 position, relative to that of the target UAV 410, could be made during the process of positioning the interceptor UAV 400, especially in the event that the target UAV 410 is in movement.

In some embodiments, the interceptor UAV 400 may have a downward looking camera 405 that is used by the operator to more accurately align the interceptor UAV 400 directly above the target UAV 410. With the disclosed system the operator may initially uses his or her direct, i.e., head-up, observation to maneuver the interceptor UAV 400 into a position generally above the target UAV 410, and then align the two vehicles by transitioning to using a display on the user interface showing the live, or near real-time, imagery from the downward looking camera 405 mounted on the interceptor UAV 400.

Figures 5A, 5B:
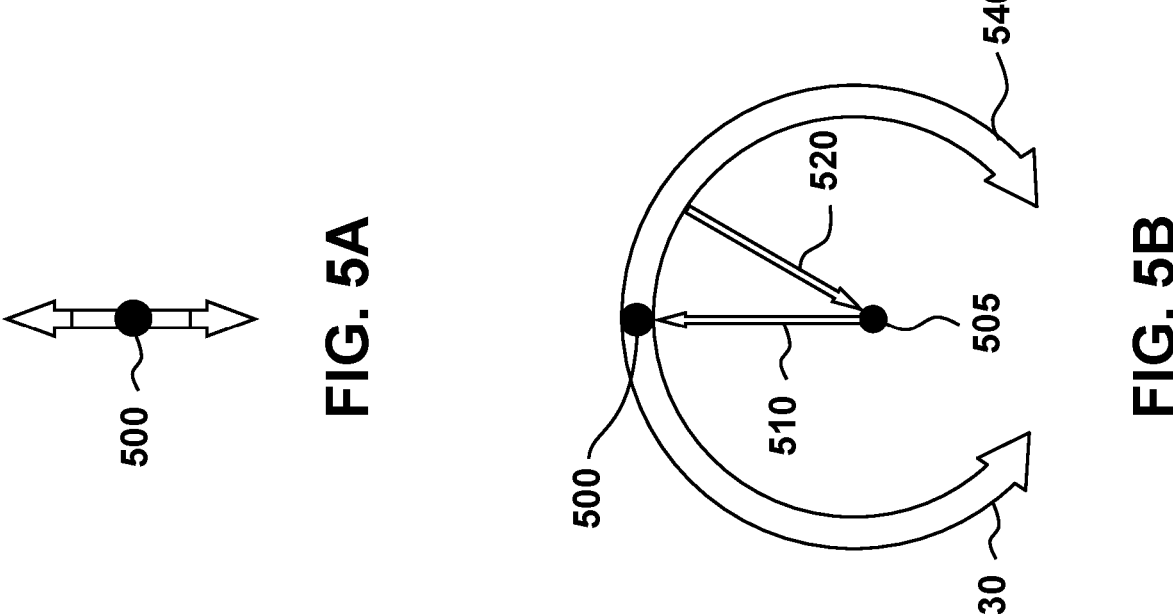
FIGS. 5A-5B depicts a radial command system relative to a user to maneuver an interceptor UAV.

FIGS. 5A-5B depict a radial command system relative to a user to maneuver an interceptor UAV. FIG. 5A depicts an operator's front view, where FIG. 5B depicts an operator's top view. The disclosed away/come back and sideways commands may be in a radial coordinate system with the operator 505 at the center point of the coordinates. As shown, the away or outwards direction 510 and the inwards or come back direction 520 are along the radial direction and the sideways left or counter-clockwise 530 and right or clockwise 540 are along an arc of a fixed radius. Using this radial coordinate system, the motion of the interceptor UAV 500 that is commanded by the operator shall always be relative to the operator in this embodiment. That is, no matter which direction the operator 505 is facing, the commands outward/inward, right/left and up/down shall always be movements relative to the operator 505, and thus resulting in a simplified operation of the interceptor UAV.

In some embodiments, the system may determine the actual position of the operator 505, such as via a GPS receiver in the user interface or ground control station (GCS) controlled by the operator 505, and adjust the radial coordinate system about this position. This would allow the operator 505 free movement while maintaining the radial coordinate system relative to the current position of the operator 505.

The operator 505 may use the GCS to control three independent variables in an 'advanced headless mode' control: altitude, range, and position. Altitude may be defined as a height of the interceptor UAV 500 above ground level, such as between 0-150 m, as shown in FIG. 5A. Range may be defined as a distance of the interceptor UAV 500 radially away 510, 520 from the operator 505 or GCS, such as between 0-500 m. Position may be defined as translating left 530 or right 540 on an arc around the operator 505, as shown in FIG. 5B. Position may be +/−360 degrees from the direction the interceptor UAV 500 was pointed at launch. Accordingly, all control inputs of the GCS may work the same no matter where the target UAV goes in relation to the user. The user may see both the target UAV and the interceptor UAV via "heads up" visual flying. The interceptor UAV may automatically point away from the operator 505 to simplify controls. A zero button/stick input on the GCS may result in a position hold of the interceptor UAV.

Figure 6A:
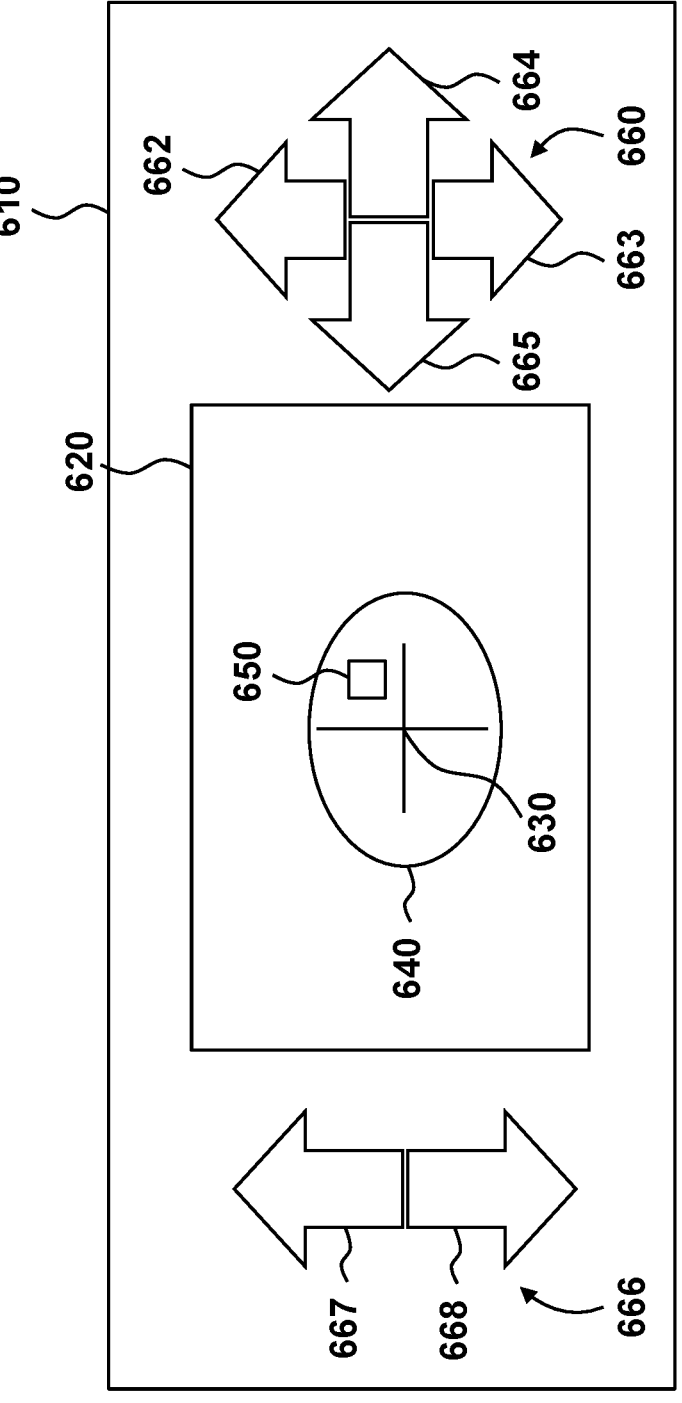
FIG. 6A depicts a user interface embodiment of a ground control station (GCS) with a drop-zone graphic overlay.

FIG. 6A depicts a user interface embodiment of a ground control station (GCS) 610 with a drop-zone graphic overlay 640. The display 620 of the user interface on the GCS 610 shows the downward camera imagery with an aiming point 630, such as a crosshairs, on the display. The aiming point 630 may be centered on the display 620 at the center field of view (CFOV). The aiming point may then be aligned with an expected downward path of the effector. In some embodiments, an area or outline of effect 640 is also shown on the display 620 to facilitate the engagement with the target threat UAV 650. This outline 640 may indicate an area surrounding the aiming point 620 where the effector would neutralize a target UAV 650. This outline 640 may increase or decrease in size on the display 620 based on a range to the target UAV 650.

The GCS 610 may also include a set of control arrows 660 to allow the operator to maneuver the interceptor UAV relative to the target UAV 650. The control arrows 660 may include forward or away 662, near or back 663, right or clockwise 664, and left or counter-clockwise 665. The GCS 610 may include a set of altitude control buttons 666 to allow the operator to change the height of the interceptor UAV 650. The altitude control buttons 666 may include up 667 and down 668. In one embodiment, the buttons may be a display, one or more buttons, one or more joysticks, lights, a voice user interface, or other user inputs.

The coordinate system used by the display 620 and movement controls 660, 666 in some embodiments can match that of the heads-up control system's radial system where the right 664 and left 665 controls move the interceptor UAV along an arc of constant radius from the operator as a center point, and the forward 662 and back 663 controls move the UAV away and towards the operator, respectfully. The controls 660, 666 may also use an x-y coordinate system where the right 664 and left 665 controls move the interceptor UAV along a straight line and forward 662 and back 663 controls move the interceptor UAV along a perpendicular line thereto.

In the embodiments using the radial coordinate system of control, the interceptor UAV may be configured to maintain its orientation in a yaw direction relative to the operator's position in order to properly maintain orientation. The UAV may continuously point away from the operator to ensure that the left and right control inputs direct the UAV along a constant radius from the operator position arc and the outward and inward control inputs direct the UAV directly away from or back towards the operator, respectfully. In some embodiments, the interceptor UAV may be in any orientation and the system may adjust movement of the interceptor UAV based on the orientation of the interceptor UAV relative to the position and orientation of the operator and/or GCS.

Figure 6B:
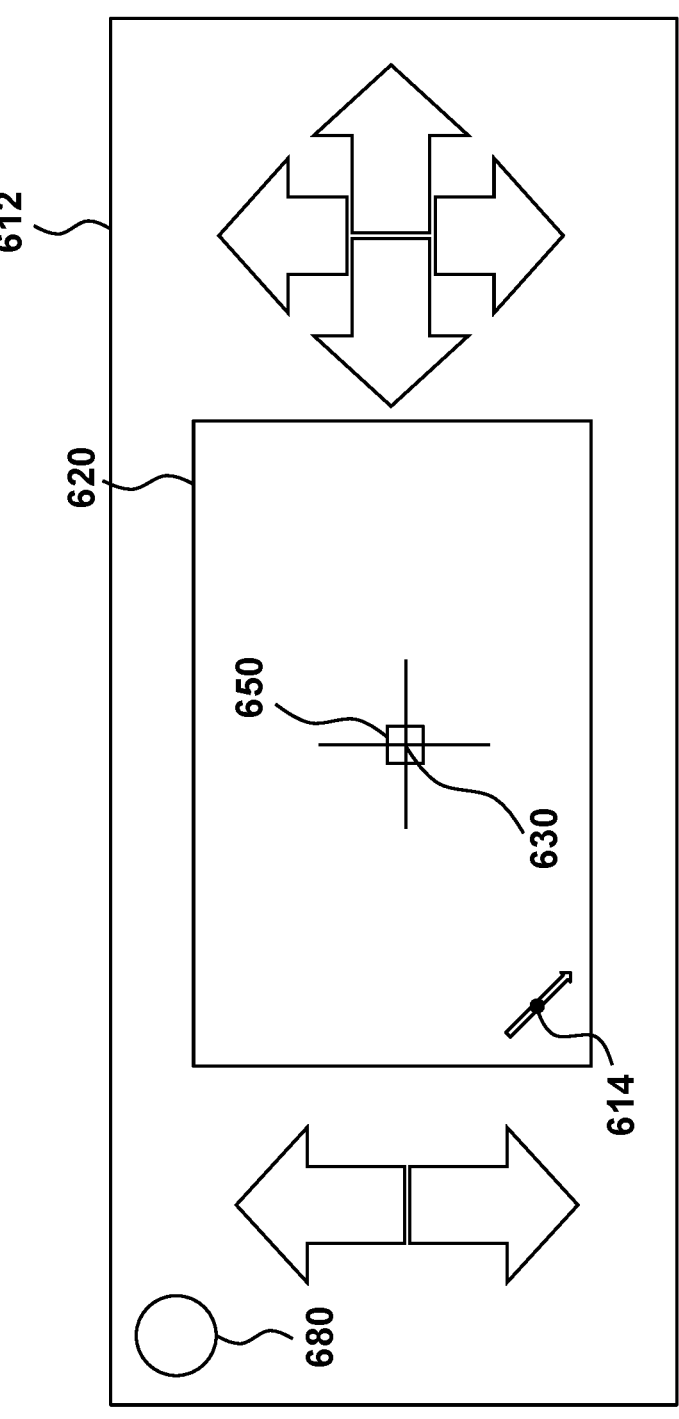
FIG. 6B depicts a user interface embodiment of a GCS with a drop button and wind direction overlay.
Figure 6C:
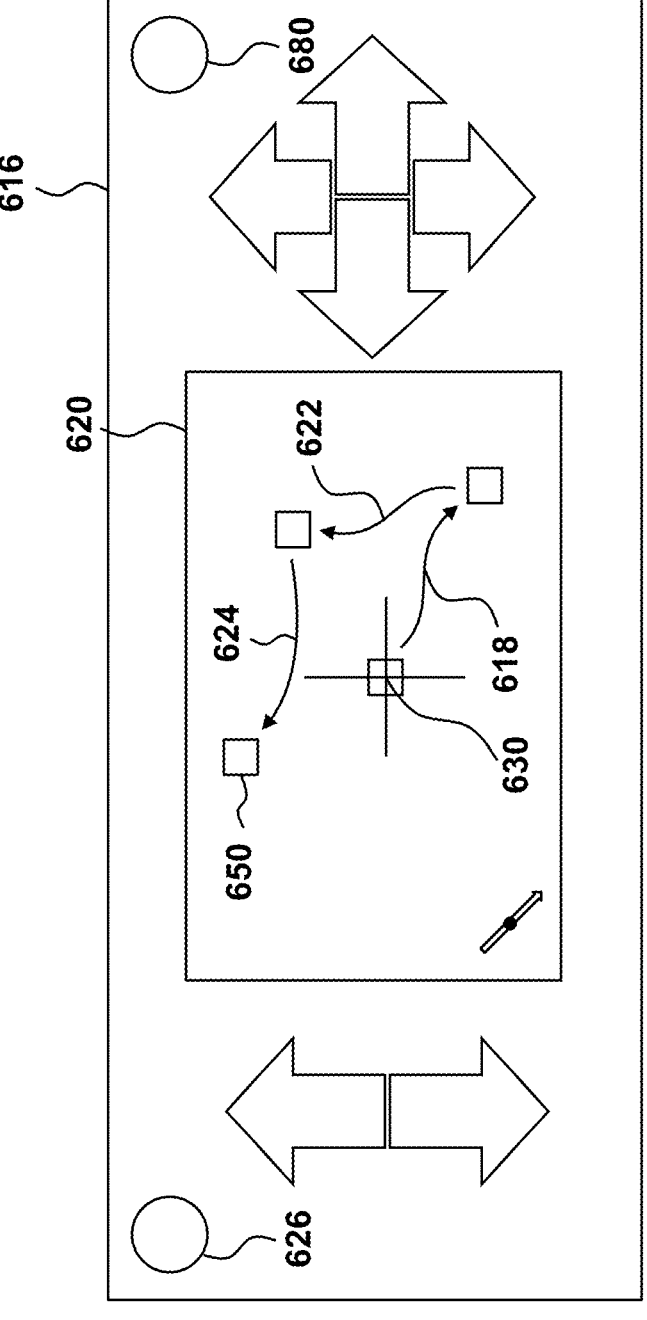
FIG. 6C depicts a user interface embodiment of a GCS with an auto-tracker showing a tracked movement of a target UAV on the display.

FIG. 6B depicts a user interface embodiment of a GCS 612 with a drop button 680 and wind direction overlay 614. Once the target UAV 650 is in the center field of view in the camera, the operator simply deploys the effector using a drop button 680. Wind direction may be shown in an overlay 614. In one embodiment, adjustments for wind may be made by the operator of the GCS manually or via an adjustment of the display 620 and/or aiming point 630. Wind data may be displayed by direct information such as direction and velocity, or by a graphic means on the screen. In this manner, the operator could manually adjust the position of the interceptor UAV relative to the target UAV 650 such that the released net would drop and be blow by the relative wind onto the target UAV 650. In another embodiment, the controller may automatically adjust for the wind without the need for operator input. In such embodiments the system would automatically adjust for the wind by modifying the displayed information. For example, the system may adjust the cross-hairs 630 or the camera centering and/or position based on the wind direction and speed and also the drag or drift effects of the particular effector, to allow the operator to align the interceptor UAV with the threat UAV 650 in the display and still obtain contact with the effector after accounting for the wind effects.

In some embodiments, tracking the target UAV 650 includes further maneuvering the interceptor UAV to pursue the target UAV 650. The interceptor UAV engages the target UAV 650 to terminate the operation of the target UAV 650. Engagement of the target UAV 650 may be done by any of a variety of means such as by the interceptor UAV dropping an effector, such as a net, tarp, sheet, warhead, projectile or the like, onto the target UAV 650 from above, as shown in FIG. 1E. In some embodiments, the effector is simply moved by gravity as it falls from the higher interceptor UAV down onto the target UAV 650. The size and shape of the effector may vary, but it may be such to allow the interceptor UAV to engage and interact with the target UAV 650 and/or with the sensors, weapons, or other equipment on the target UAV 650 and render such target UAV 650 inoperable or at least reduce its effectiveness.

For example, in some embodiments the effector may be a net that is dropped by the interceptor UAV from above and down onto the target UAV 650, as shown in FIG. 1F. In some embodiments, the net has openings that are smaller than the width of the diameter of the target UAV 650, and may even be sized smaller than a rotor of the target UAV 650. In this manner the net shall entangle the target UAV 650 preventing or limiting its motion to render it in operable or at least substantially ineffective. The net may be weighted or otherwise structured to expand as it is deployed to facilitate maximizing its size and thus its potential for contacting the threat UAV 650. In some embodiments, the net may be spun prior to or after it is dropped from the interceptor UAV, which facilitates the net opening. The effector may be of an opaque or semi-opaque material such to interfere or prevent the use of any camera or other sensors on the target UAV 650. Likewise, the effector may be a conductive material, such as a wire mesh, to prevent or at least limit transmission of radio signals from the target UAV 650. The interceptor UAV may carry multiple effectors per flight that may be used until the threat from the UAV 650 is mitigated.

FIG. 6C depicts a user interface of a GCS 616 embodiment with an auto-tracker showing a tracked movement 618, 622, 624 of a target UAV 650 on the display 620. The operator may activate the auto-tracker by using a lock button 626 and/or selecting the target UAV 650 on the display 620. An auto-tracker may be utilized in the disclosed system to allow the operator to "lock on" to the target UAV 650. The auto-tracking system may use a variety of different methods to perform the auto-tracking, including but not limited to, contrast in the video imagery. Once "locked on" the interceptor UAV may automatically remain above the threat vehicle if it moved below. In other embodiments, the gimbal of the interceptor UAV may move to maintain the target UAV 650 within an aiming point 630 or a drop-zone, as shown in FIG. 6A.

Figure 7:
FIG. 7 illustrates a top level functional block diagram of a computing device embodiment of an interceptor UAV and/or GCS.
Figure 7:
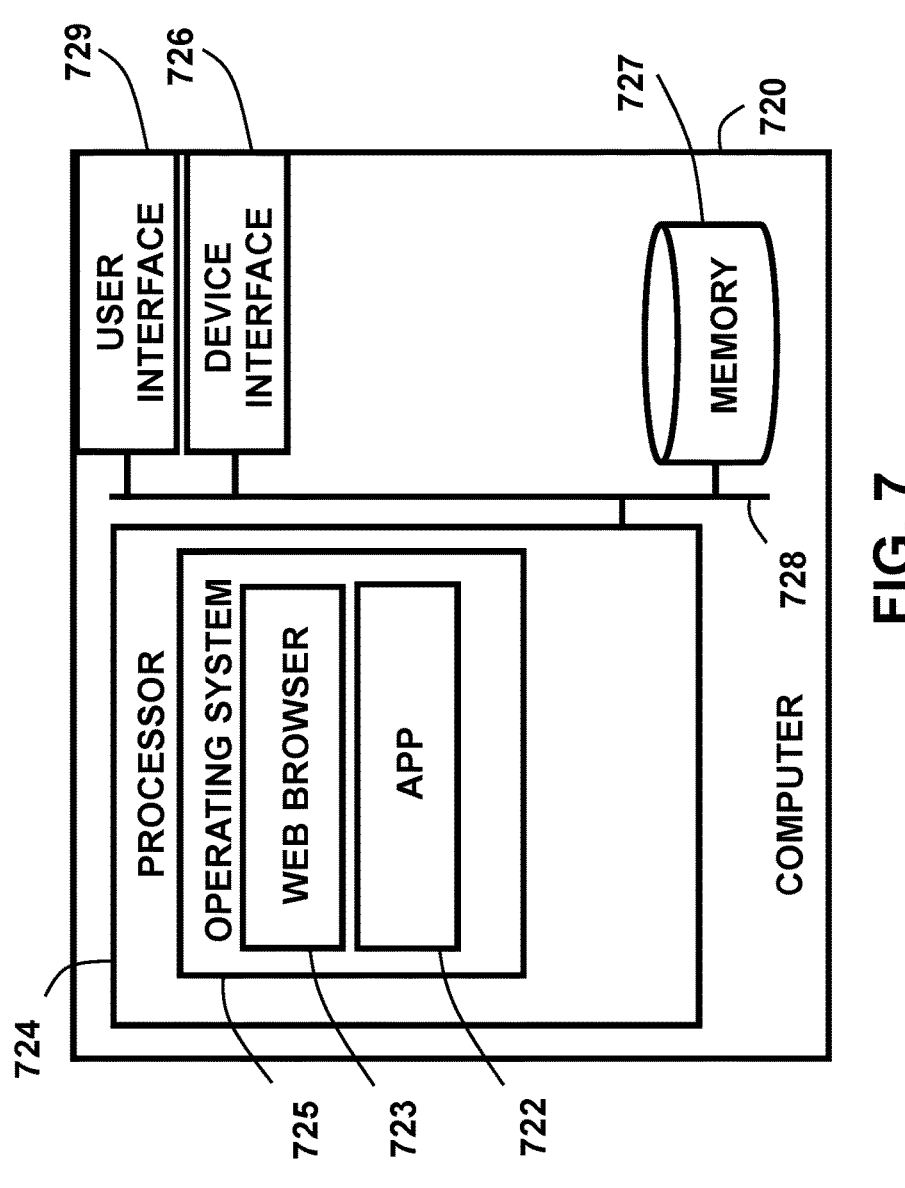

FIG. 7 illustrates a top-level functional block diagram of a computing device embodiment of an interceptor UAV and/or GCS. The embodiment 700 is shown as a computing device 720 having a processor 724, such as a central processing unit (CPU), addressable memory 727, an external device interface 726, e.g., an optional universal serial bus port and related processing, and/or an Ethernet port and related processing, and an optional user interface 729, e.g., an array of status lights and one or more toggle switches, and/or a display, and/or a keyboard and/or a pointer-mouse system and/or a touch screen. Optionally, the addressable memory 727 may, for example, be: flash memory, eprom, and/or a disk drive or other hard drive. These elements may be in communication with one another via a data bus 728. The processor 724 may have an operating system 725 such as one supporting a web browser 723 and/or applications 722, which may be configured to execute steps of a process according to the example embodiments described herein.

Figures 8, 9:
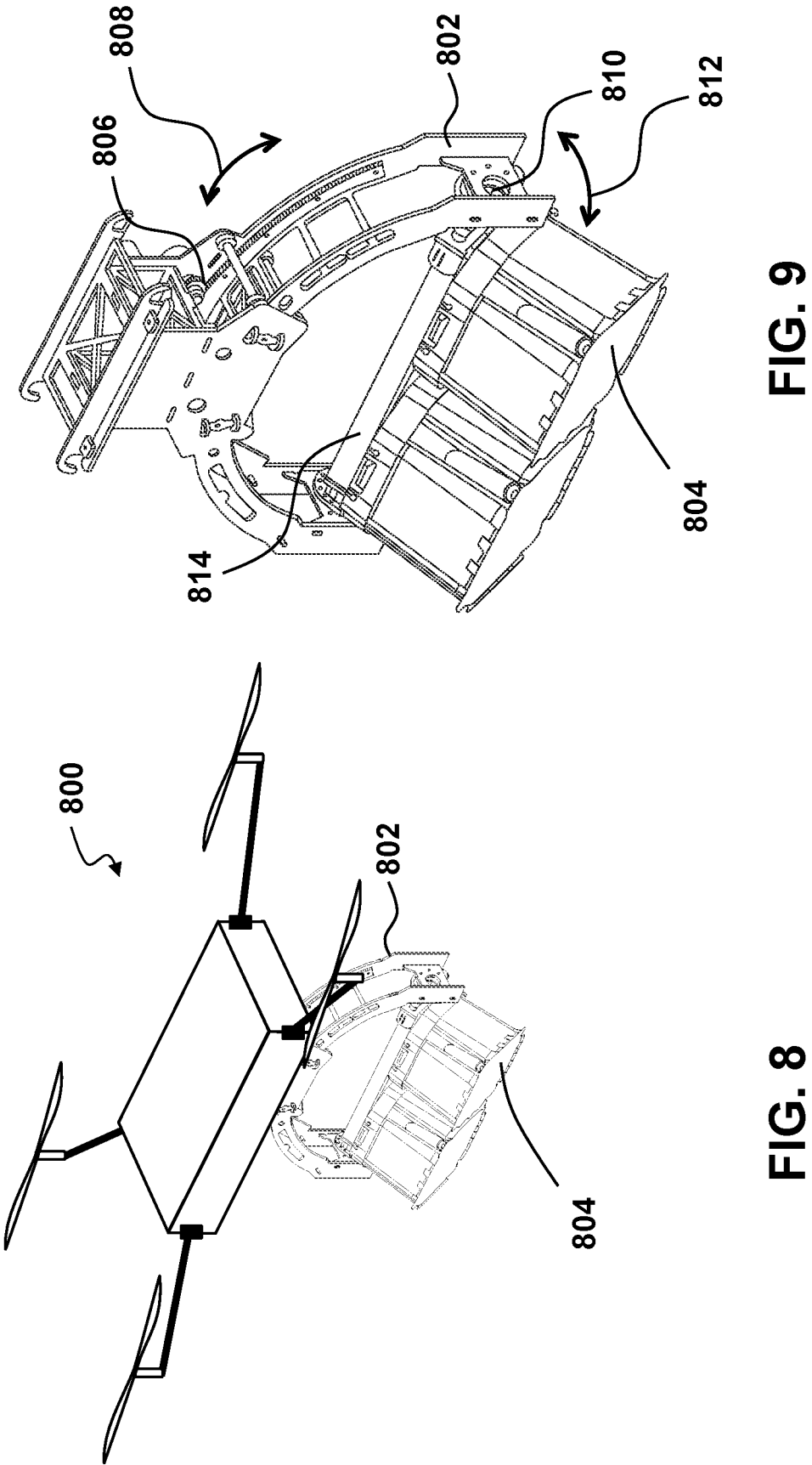
FIG. 8 depicts a perspective view of an interceptor UAV having a gimbal and a plurality of deployment devices.
FIG. 9 depicts a perspective view of a gimbal and a plurality of deployment devices.

FIG. 8 depicts a perspective view of an interceptor UAV 800 having a gimbal 802 and a plurality of deployment devices 804. The interceptor UAV 800 may be any air vehicle capable of hovering flight and may be any of a variety of known and commercially available air vehicles, such as a quadrotor UAV or a six-rotor UAV as shown. In some embodiments, the interceptor UAV 800 may be a fixed-wing aerial vehicle capable of maintaining a holding pattern about or near a target UAV. The gimbal 802 may be fixedly or detachably attached to the interceptor UAV 800. One or more deployment devices 804 may be detachably attached to the gimbal. The deployment devices 804 may be positioned relative to the interceptor UAV 800 via the movement of the gimbal 802.

FIG. 9 depicts a perspective view of a gimbal 802 and a plurality of deployment devices 804. The gimbal 802 may have one or more roll motors 806 to control a roll axis 808 of the attached deployment devices 804. The gimbal 802 may also have one or more tilt motors 810 to control a tilt axis 812 of the attached deployment devices 804. A yaw axis of the deployment device 804 may be controlled via a movement of the interceptor UAV, i.e., via control of the motors of the interceptor UAV. A deployment device base 814 may be attached to the gimbal 802. Each deployment device 804 may be detachably attached to the deployment device base 814. By controlling the roll motors 806, tilt motors 810, and one or more motors of the interceptor UAV 800, as shown in FIG. 8, the deployment device may be oriented toward and track the movement of a target UAV. In some embodiments, a camera may be attached to the deployment device base 814 so that the orientation of the deployment device corresponds to the video feed received by a ground control system (GCS). The deployment device 804 may be removed from the deployment device base 814 or gimbal 802, as shown in FIG. 1H.

FIG. 10A depicts a perspective view of a deployment device 804. FIG. 10B depicts another perspective view of the deployment device 804 of FIG. 10A. FIG. 10C depicts a perspective cross sectional view of the deployment device 804 of FIG. 10A about line C-C. FIG. 10D depicts a side cross sectional view of the deployment device 804 of FIG. 10A about line C-C. The deployment device may include an outer housing 1000, a cover 1002, a gas generator 1004, a gas generator retainer 1006, a slug 1008, an inner housing 1010, a snap interface 1012, and a Printed Circuit Board Assembly (PCBA) connector 1014. A net (not shown) may be disposed in an inner volume 1016 of the deployment device 804. The deployment device may be made from a carbon fiber structure or other suitable material to absorb both the recoil of the effector during actuation as well as the impact of the falling target on the tether once the target has been captured.

The gas generator 1004 may be triggered, such as by a 1 Amp current from a battery, to generate gas that fills a closed volume 1018 and propels each of the slugs 1008 out from their respective slug tubes 1020. The movement of the slugs 1008 may then cause the cover 1002 to open or burst out. In some embodiments, the cover 1002 may be hinged or tethered to the deployment device 804. An effector, such as a net disposed in the inner volume 1016, may be connected to each of the slugs at an aperture 1022 or other connector. Each of the slugs 1008 may be propelled in different directions, which may cause the effector to open up and reach a maximum surface area for covering and intercepting a target. A tether (not shown) may be connected to the deployment device 804 and the effector. In one embodiment, the tether may be detachably attached to the interceptor UAV allowing the operator to initiate a command in order to release the tether, and therefore, the captured UAV from the air.

Each deployment device 804 may be detachably attached to the deployment device base, such as by snapping the deployment device into place with one hand via the snap interface 1012. In some embodiments, the snap interface 1012 may provide an electrical impulse required to fire the effector from the deployment device 804. In some embodiments, by way of an example and not limitation, the deployment device 804 may be about 3.5 inches×5.3 inches×5.3 inches and have a volume of about 100 cubic inches. The deployment device 804 may be lightweight, such as under 550 grams. The deployment device 804 may have a minimal number of parts, such as twenty or fewer. The outer housing 1000, cover 1002, and inner housing 1010 may be made from an injection molded plastic. In some embodiments, the gas generator 1004 may be added last. The deployment device 804 may be transported or stored without the gas generator 1004 installed.

The deployment device 804 may include a safety circuit to prevent inadvertent firing of the gas generator 1004. The safety circuit may have a 2 ohm bridge resistance, where the gas generator will not fire at 0.4 A×10 seconds and will fire at 1.2 Amps at 2 ms. The safety circuit may include a to pole double throw normally closed (NC) relay which shorts out the gas generator 1004 when not energized. In some embodiments, the safety control may be done in the vehicle and not in an actuator of the gas generator 1004. To arm the actuator, the vehicle may supply 12 V to the relay to open the short across the generator and to connect the generator to the two firing contacts. To fire, a current of 1.2 A×2 ms may be supplied to the firing contacts. The safety circuit may be software-based, a physical circuit, or a combination of software and hardware. In some embodiments, the firing circuit for the gas generator 1004 may use a firing cap. The firing cap may be charged when the arm is commanded, and the cap self discharges once the arm command is removed.

FIG. 11A depicts a deployment device 1100 with a narrower angle 1102 for weights 1104 to be released. Each deployment device 1100 may have a different effector deployment force and/or a different angle 1102 for weights 1104 to be released relative to the deployment device 1100. A narrower angle 1102 for the weight release may cause the effector 1106 to go a further distance 1108 from the deployment device 1100 before opening up as compared to having a wider angle, as shown in FIG. 11B. A gas generator may be triggered to generate gas that fills a closed volume and propels 1112 each of the weights 1104 out from their respective tubes 1114, as shown in FIG. 10C. In some embodiments, a tether 1116 may be connected to the effector 1106 and may limit the overall distance the effector 1106 travels from the deployment device 1100.

FIG. 11B depicts a deployment device 1118 with a wider angle 1120 for weights 1122 being released as compared to the deployment device 1100 of FIG. 11A. The wider angle 1120 for the weights 1122 to be release may cause the effector 1124 to go a shorter distance 1126 from the deployment device 1118 before opening up as compared to the narrower angle shown in FIG. 11A. A gas generator may be triggered to generate gas that fills a closed volume and propels 1128 each of the weights 1122 out from their respective tubes 1130, as shown in FIG. 10C. In some embodiments, a tether 1132 may be connected to the effector 1124 and may limit the overall distance the effector 1124 travels from the deployment device 1118.

FIG. 12 depicts various positions of an interceptor UAV 1200 relative to a target UAV 1202 for engaging the target UAV 1202. The interceptor UAV 1200 may be positioned above 1204 the target UAV 1202 to allow for deployment, by gravity, of an effector. In some embodiments, the interceptor UAV 1200 may be in an alternate position relative to the target UAV 1202, such as at an angle 1206 relative to the target UAV 1202, to the side 1208 of the target UAV 1202 104, and lower plane 1210 under the target UAV 1202. The interceptor UAV 1200 may move a two-axis gimbal and/or the orientation of the interceptor UAV 1200 itself, as in position underneath 1210, to provide three-axis control to deploy an effector that can capture a target UAV 1202, as shown in FIG. 1E. In one embodiment, the camera used to identify and track the target UAV may be bore sighted to the deployment device so that wherever the camera points, the effector is ready to fire without requiring further adjustments to the angle and/or position of the interceptor UAV.

FIG. 13A depicts an embodiment of an aerial vehicle intercept system having an interceptor UAV 1300 deploying an effector 1302 towards a target UAV 1304. The interceptor UAV 1306 is positioned at an angle to 1306 the target UAV 1304. A gimbal 1308 is angled to aim the deployment device 1310 towards the target UAV 1304. As the effector 1302 is deployed, weights 1312 connected to the effector 1302 are propelled 1314 from the deployment device 1310. A tether 1316 connects the effector 1302 to the deployment device 1310.

FIG. 13B depicts an embodiment of the system of FIG. 13A with the gimbal 1308 rotated 1318 to a downward position once the effector 1302 is deployed such that the gimbal 1308 and deployment device 1310 are facing downward when the tether 1316 catches the weight of the intercepted target UAV 1304. This position of the gimbal 1308 and deployment device 1310 minimize any lateral forces on the interceptor UAV 1300 that may act to unbalance the interceptor UAV 1300.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
   displaying an identified target aerial vehicle and an interceptor aerial vehicle on a display of a ground control station (GCS) having a processor and addressable memory in communication with the interceptor aerial vehicle;

deploying, via the GCS, the interceptor aerial vehicle, wherein the interceptor aerial vehicle comprises at least one gimbal comprising one or more deployment devices detachably attached to the interceptor aerial vehicle, wherein each deployment device comprises: at least one capturing device deployable towards a target and a launcher configured to deploy the at least one capturing device and comprising a gas generator to deploy the at least one capturing device and a safety circuit configured to enable activation of the gas generator only when a measured current supplied to the gas generator is at least a threshold current value for at least a threshold time interval, and wherein the safety circuit is configured to inhibit activation of the gas generator upon transient currents shorter than the threshold time interval;

maneuvering, via the GCS, the interceptor aerial vehicle in at least one of: a vertical direction, a horizontal direction toward the target aerial vehicle, and a sideways direction until the interceptor aerial vehicle is positioned above the target aerial vehicle;

deploying, via the GCS, the at least one capturing device to intercept the target aerial vehicle; and detaching, via the GCS, the one or more deployment devices along with the intercepted target aerial vehicle when the intercepted target aerial vehicle is released such that the one or more deployment devices remain with the intercepted target aerial vehicle when released.

2. The method of claim 1, wherein maneuvering the interceptor aerial vehicle in the vertical direction comprises an up command from an operator of the GCS.

3. The method of claim 2, wherein maneuvering the interceptor aerial vehicle in the horizontal direction toward the target aerial vehicle comprises an away command from the operator of the GCS.

4. The method of claim 2, wherein maneuvering the interceptor aerial vehicle in the horizontal direction toward the target aerial vehicle comprises moving the interceptor aerial vehicle until the interceptor aerial vehicle is a same physical size as the target aerial vehicle when the interceptor aerial vehicle and the target aerial vehicle are about a same physical size.

5. The method of claim 2, wherein maneuvering the interceptor aerial vehicle in the horizontal direction toward the target aerial vehicle comprises moving the interceptor aerial vehicle until the interceptor aerial vehicle is a same relative physical size as the target aerial vehicle when the interceptor aerial vehicle and the target aerial vehicle are different physical sizes.

6. The method of claim 1, wherein maneuvering, via the GCS, the interceptor aerial vehicle is in a radial coordinate system with the GCS at a center point of a coordinates.

7. The method of claim 6, wherein an altitude is a height of the interceptor aerial vehicle above a ground level, wherein a range is a distance of the interceptor aerial vehicle radially away from the GCS, and wherein a position is translating at least one of:

left and right on an arc around the GCS.

8. The method of claim 1, further comprising, prior to deploying the at least one capturing device:

displaying on the display of the GCS a drop-zone overlay graphic, wherein the drop-zone overlay graphic comprises an aiming point and an outline of effect;

wherein the aiming point is aligned with an expected downward path of the at least one capturing device; and wherein the outline of effect comprises an area surrounding the aiming point where the at least one capturing device would neutralize the target aerial vehicle, wherein the outline of effect increases and decreases in size based on a range to the target aerial vehicle.

9. A system comprising:

an interceptor aerial vehicle, wherein the interceptor aerial vehicle comprises at least one gimbal comprising one or more deployment devices detachably attached to the interceptor aerial vehicle, wherein each deployment device comprises: at least one capturing device deployable towards a target and a launcher to deploy the at least one capturing device; and a ground control station (GCS) having a processor and addressable memory, the GCS in communication with the interceptor aerial vehicle, wherein the processor of the GCS is configured to:

display a target aerial vehicle and the interceptor aerial vehicle on a display of the GCS;

deploy the interceptor aerial vehicle;

maneuver the interceptor aerial vehicle in at least one of: a vertical direction, a horizontal direction toward the target aerial vehicle, and a sideways direction until the interceptor aerial vehicle is positioned above the target aerial vehicle; and deploying the at least one capturing device to intercept the target aerial vehicle, wherein the one or more deployment devices are configured to be detached along with the intercepted target aerial vehicle when the intercepted target aerial vehicle is released such that the one or more deployment devices remain with the intercepted target aerial vehicle when released;

a gas generator configured to deploy a corresponding capturing device; and a safety circuit configured to enable activation of the gas generator only when a measured current supplied to the gas generator is at least a threshold current value for at least a threshold time interval, and wherein the safety circuit is configured to inhibit activation of the gas generator upon transient currents shorter than the threshold time interval.

10. The system of claim 9, wherein maneuvering the interceptor aerial vehicle in the vertical direction comprises an up command from an operator of the GCS.

11. The system of claim 10, wherein maneuvering the interceptor aerial vehicle in the horizontal direction toward the target aerial vehicle comprises an away command from the operator of the GCS.

12. The system of claim 10, wherein maneuvering the interceptor aerial vehicle in the horizontal direction toward the target aerial vehicle comprises moving the interceptor aerial vehicle until the interceptor aerial vehicle is a same physical size as the target aerial vehicle when the interceptor aerial vehicle and the target aerial vehicle are about a same physical size.

13. The system of claim 10, wherein maneuvering the interceptor aerial vehicle in the horizontal direction toward the target aerial vehicle comprises moving the interceptor aerial vehicle until the interceptor aerial vehicle is a same relative physical size as the target aerial vehicle when the interceptor aerial vehicle and the target aerial vehicle are different physical sizes.

14. The system of claim 9, wherein maneuvering, via the GCS, the interceptor aerial vehicle is in a radial coordinate system with the GCS at a center point of a coordinates.

15. The system of claim 14, wherein an altitude is a height of the interceptor aerial vehicle above a ground level, wherein a range is a distance of the interceptor aerial vehicle radially away from the GCS, and wherein a position is translating at least one of:

left and right on an arc around the GCS.

16. The system of claim 9, wherein the processor of the GCS is configured to, prior to deploying the at least one capturing device:

display on the display of the GCS a drop-zone overlay graphic, wherein the drop-zone overlay graphic comprises an aiming point and an outline of effect;

wherein the aiming point is aligned with an expected downward path of the at least one capturing device; and wherein the outline of effect comprises an area surrounding the aiming point where the at least one capturing device would neutralize the target aerial vehicle, wherein the outline in effect increases and decreases in size based on a range to the target aerial vehicle.

\* \* \* \* \*